(12) United States Patent
Pehar et al.

(10) Patent No.: US 11,465,914 B2
(45) Date of Patent: Oct. 11, 2022

(54) GRAVITY-FLOW FILTER ASSEMBLY

(71) Applicant: HYDROS BOTTLE, LLC, San Francisco, CA (US)

(72) Inventors: David Michael Pehar, Willoughby, OH (US); Trevor L. Jackson, Kirtland, OH (US); Robert Craig Allen, Richmond Heights, OH (US); Marc Louis Vitantonio, South Russell, OH (US); Jess Paul Carlson, Bainbridge, OH (US); Winston Ibrahim, Tiburon, CA (US); Jon Holland, San Rafael, CA (US)

(73) Assignee: Hydros Bottle, LLC, San Francisco, CA (US)

( * ) Notice: Subject to any disclaimer, the term of this patent is extended or adjusted under 35 U.S.C. 154(b) by 468 days.

(21) Appl. No.: 15/762,493

(22) PCT Filed: Sep. 22, 2016

(86) PCT No.: PCT/US2016/053147
§ 371 (c)(1),
(2) Date: Mar. 22, 2018

(87) PCT Pub. No.: WO2017/053588
PCT Pub. Date: Mar. 30, 2017

(65) Prior Publication Data
US 2018/0273398 A1 Sep. 27, 2018

Related U.S. Application Data

(60) Provisional application No. 62/232,334, filed on Sep. 24, 2015.

(51) Int. Cl.
*C02F 1/00* (2006.01)
*A45F 3/16* (2006.01)
(Continued)

(52) U.S. Cl.
CPC ............... *C02F 1/003* (2013.01); *A45F 3/16* (2013.01); *A45F 2003/163* (2013.01);
(Continued)

(58) Field of Classification Search
CPC .................................................. A45F 2003/163
See application file for complete search history.

(56) References Cited

U.S. PATENT DOCUMENTS 2,224,577 A 12/1940 Shively et al.
3,335,917 A 8/1967 Knight
(Continued)

FOREIGN PATENT DOCUMENTS

CA 982779 A 2/1976
CN 202760835 U 3/2013
(Continued)

OTHER PUBLICATIONS

English language machine translation of WO 2016/117850, retrieved Oct. 22, 2020. (Year: 2020).*
(Continued)

*Primary Examiner* — David C Mellon
(74) *Attorney, Agent, or Firm* — Knobbe, Martens, Olson & Bear, LLP

(57) ABSTRACT

An apparatus for dispensing a liquid is disclosed. The apparatus can include a cap configured to connect to a container body having a chamber for containing the liquid. The cap can include a fill aperture through which the liquid is supplied to the container body and a pour aperture through which the liquid exits the apparatus. A fill lid can be rotatable about a pivot axis in a first direction to close the fill aperture and rotatable about the pivot axis in a second direction to open the fill aperture, the first direction opposite the second direction. A pour lid can be rotatable about the pivot axis in the first direction to open the pour aperture and rotatable
(Continued)

about the pivot axis in the second direction to close the pour aperture. A filter assembly comprising a filter cartridge can connect to the cap.

15 Claims, 16 Drawing Sheets

(51) Int. Cl.
    *C02F 1/28*                    (2006.01)
    *B65D 41/04*                (2006.01)

(52) U.S. Cl.
    CPC .............. *B65D 41/04* (2013.01); *C02F 1/283* (2013.01); *C02F 2201/006* (2013.01); *C02F 2307/02* (2013.01); *C02F 2307/04* (2013.01)

(56) References Cited

U.S. PATENT DOCUMENTS

| | | | |
|---|---|---|---|
| 3,420,611 A | 1/1969 | Towns | |
| D235,206 S | 5/1975 | Bertrand | |
| D242,043 S | 10/1976 | Corder et al. | |
| 4,369,901 A | 1/1983 | Hidding | |
| 4,419,235 A | 12/1983 | Sway | |
| 4,585,151 A | 4/1986 | Luker | |
| 4,605,499 A | 8/1986 | Wise | |
| D285,958 S | 9/1986 | Koizumi et al. | |
| D289,914 S | 5/1987 | Willinger et al. | |
| 4,695,379 A | 9/1987 | Nohren, Jr. et al. | |
| 4,717,050 A | 1/1988 | Wright | |
| 4,732,303 A | 3/1988 | Wang | |
| 4,764,274 A | 8/1988 | Miller | |
| 4,769,144 A | 9/1988 | Nohren, Jr. | |
| 4,782,985 A | 11/1988 | Kinsley | |
| D313,266 S | 12/1990 | Geneve et al. | |
| 4,986,901 A | 1/1991 | Nohren, Jr. et al. | |
| 5,002,665 A | 3/1991 | Brueggemann | |
| 5,130,020 A | 7/1992 | Meckstroth | |
| 5,143,261 A * | 9/1992 | Drobish | B65D 81/3216 222/129 |
| 5,215,660 A | 6/1993 | Mosher | |
| D338,946 S | 8/1993 | Taylor et al. | |
| 5,238,140 A | 8/1993 | Maze | |
| 5,242,079 A | 9/1993 | Stephens et al. | |
| 5,244,113 A | 9/1993 | Stymiest | |
| 5,303,850 A | 4/1994 | Connan | |
| 5,368,739 A | 11/1994 | Dussert et al. | |
| D354,198 S | 1/1995 | Chiang et al. | |
| 5,393,548 A | 2/1995 | Heiligman | |
| 5,415,312 A | 5/1995 | Mueller | |
| 5,431,813 A | 7/1995 | Daniels | |
| 5,477,994 A | 12/1995 | Feer et al. | |
| 5,509,551 A | 4/1996 | Terrell, II | |
| 5,609,759 A | 3/1997 | Nohren, Jr. et al. | |
| 5,615,809 A | 4/1997 | Feer et al. | |
| 5,635,063 A | 6/1997 | Rajan et al. | |
| 5,653,878 A | 8/1997 | Reid | |
| D383,192 S | 9/1997 | Johnson | |
| 5,681,463 A | 10/1997 | Shimizu et al. | |
| 5,688,397 A | 11/1997 | Malmborg | |
| 5,797,521 A | 8/1998 | Sobral | |
| 5,836,364 A | 11/1998 | Burton | |
| 5,840,185 A | 11/1998 | Hughes et al. | |
| 5,914,045 A | 6/1999 | Palmer et al. | |
| 5,919,365 A | 7/1999 | Collette | |
| 5,928,512 A | 7/1999 | Hatch et al. | |
| 5,960,999 A * | 10/1999 | Wallays | B65D 83/06 222/142.2 |
| 6,004,460 A | 12/1999 | Palmer et al. | |
| 6,136,188 A | 10/2000 | Rajan et al. | |
| 6,136,189 A | 10/2000 | Smith et al. | |
| 6,165,362 A | 12/2000 | Nohren, Jr. et al. | |
| 6,193,886 B1 | 2/2001 | Nohren, Jr. | |
| 6,200,483 B1 | 3/2001 | Cutler et al. | |
| 6,277,284 B1 | 8/2001 | Nohren | |
| 6,382,476 B1 | 5/2002 | Randall et al. | |
| 6,395,170 B1 | 5/2002 | Hughes et al. | |
| 6,405,875 B1 | 6/2002 | Cutler | |
| 6,468,435 B1 | 10/2002 | Hughes et al. | |
| 6,524,477 B1 | 2/2003 | Hughes | |
| 6,565,743 B1 | 5/2003 | Poirier et al. | |
| 6,569,329 B1 | 5/2003 | Nohren, Jr. | |
| D477,382 S | 7/2003 | Strand | |
| 6,619,493 B2 | 9/2003 | Yang | |
| 6,631,744 B1 | 10/2003 | Gerhart et al. | |
| 6,733,669 B1 | 5/2004 | Crick | |
| 6,783,019 B2 | 8/2004 | Zettle et al. | |
| D505,831 S | 6/2005 | Liu | |
| 6,945,289 B2 | 9/2005 | Marszalec et al. | |
| D510,235 S | 10/2005 | Sorensen | |
| D513,304 S | 12/2005 | Suzuki | |
| D518,555 S | 4/2006 | De Muro, Jr. | |
| 7,131,550 B2 | 11/2006 | Vilalta et al. | |
| D541,374 S | 4/2007 | Colussi et al. | |
| 7,255,241 B2 | 8/2007 | Yoneoka et al. | |
| 7,396,461 B2 | 7/2008 | Bommi et al. | |
| D580,765 S | 11/2008 | Amann | |
| D584,107 S | 1/2009 | George | |
| 7,473,362 B1 | 1/2009 | Nohren, Jr. | |
| D592,729 S | 5/2009 | Born et al. | |
| D596,703 S | 7/2009 | McKinney et al. | |
| D596,704 S | 7/2009 | Born et al. | |
| D598,234 S | 8/2009 | Bodum | |
| 7,585,409 B2 | 9/2009 | Bommi et al. | |
| 7,690,524 B2 | 4/2010 | Chau | |
| 7,713,483 B2 | 5/2010 | Maiden | |
| 7,754,898 B2 | 7/2010 | Kobayashi | |
| D623,017 S | 9/2010 | George | |
| 7,798,346 B2 | 9/2010 | Nelson et al. | |
| D627,600 S | 11/2010 | Eyal | |
| 7,913,869 B2 | 3/2011 | Cuocolo, Jr. | |
| 7,931,166 B2 | 4/2011 | Cuocolo, Jr. | |
| D640,084 S | 6/2011 | Sheppard et al. | |
| 7,975,883 B2 | 7/2011 | Laib et al. | |
| D642,852 S | 8/2011 | Sheppard et al. | |
| D642,916 S | 8/2011 | Handy | |
| 8,025,802 B2 | 9/2011 | Walde et al. | |
| 8,043,502 B2 | 10/2011 | Nauta | |
| D647,760 S | 11/2011 | Pearson | |
| D649,402 S | 11/2011 | Gilbert et al. | |
| D650,235 S | 12/2011 | Eyal | |
| 8,097,159 B1 | 1/2012 | Peng | |
| 8,113,359 B2 | 2/2012 | Perryman | |
| 8,142,654 B2 | 3/2012 | Kohl | |
| D656,787 S | 4/2012 | Phillips et al. | |
| D658,064 S | 4/2012 | Barnes et al. | |
| 8,167,141 B2 | 5/2012 | Knipmeyer et al. | |
| D662,776 S | 7/2012 | Eyal | |
| D664,002 S | 7/2012 | Eyal | |
| 8,216,465 B2 | 7/2012 | Nauta | |
| 8,245,870 B2 | 8/2012 | McKinney et al. | |
| 8,276,776 B2 | 10/2012 | Roth et al. | |
| 8,277,666 B2 | 10/2012 | Sturgess | |
| 8,337,697 B2 | 12/2012 | Risheq | |
| D674,463 S | 1/2013 | Wilder et al. | |
| D674,464 S | 1/2013 | Wilder et al. | |
| 8,388,841 B2 | 3/2013 | Moretto | |
| 8,439,205 B1 | 5/2013 | Nohren, Jr. | |
| 8,454,826 B2 | 6/2013 | Donnelly et al. | |
| 8,459,510 B2 | 6/2013 | Richards et al. | |
| D686,885 S | 7/2013 | Meyers et al. | |
| D686,886 S | 7/2013 | Meyers et al. | |
| D690,161 S | 9/2013 | Garner | |
| 8,541,039 B2 | 9/2013 | Lackey et al. | |
| 8,579,133 B2 | 11/2013 | Marcus et al. | |
| D694,852 S | 12/2013 | Gordon | |
| D696,079 S | 12/2013 | Meyers et al. | |
| 8,597,512 B2 | 12/2013 | Sturgess | |
| D696,892 S | 1/2014 | Bretillot | |
| D697,798 S | 1/2014 | Sorensen et al. | |
| 8,668,106 B1 | 3/2014 | Joy et al. | |
| 8,672,174 B1 | 3/2014 | McMullin | |
| 8,757,452 B2 | 6/2014 | Richards et al. | |

(56) References Cited

U.S. PATENT DOCUMENTS

| | | |
|---|---|---|
| 8,758,605 B2 | 6/2014 | Risheq |
| D708,954 S | 7/2014 | Barnes et al. |
| 8,778,244 B2 | 7/2014 | Rusinov et al. |
| 8,794,469 B2 | 8/2014 | Bratsch |
| 8,827,099 B2 | 9/2014 | Joy et al. |
| 8,845,895 B1 | 9/2014 | Ghiassi |
| 8,926,840 B2 | 1/2015 | Hull et al. |
| 8,960,506 B2 | 2/2015 | Belike et al. |
| 8,978,923 B2 | 3/2015 | George |
| D726,475 S | 4/2015 | Wittke et al. |
| D727,680 S | 4/2015 | Parekh et al. |
| D727,682 S | 4/2015 | Madvin |
| 9,004,292 B2 | 4/2015 | Carter et al. |
| D729,579 S | 5/2015 | Molayem |
| 9,045,353 B2 | 6/2015 | Parekh et al. |
| D734,638 S | 7/2015 | Wahl |
| D747,936 S | 1/2016 | Chitayat et al. |
| D754,999 S | 5/2016 | Gamelli |
| D761,608 S | 7/2016 | Gamelli et al. |
| D763,086 S | 8/2016 | Kalagher |
| D766,652 S | 9/2016 | Joseph et al. |
| D767,336 S | 9/2016 | Waggoner et al. |
| D767,930 S | 10/2016 | Gamelli et al. |
| D769,043 S | 10/2016 | Gamelli et al. |
| D772,022 S | 11/2016 | Cornu et al. |
| D776,483 S | 1/2017 | Chitayat et al. |
| D778,095 S | 2/2017 | Gamelli et al. |
| D788,529 S | 6/2017 | Chitayat et al. |
| D798,110 S | 9/2017 | Valenti et al. |
| D801,184 S | 10/2017 | Trevino |
| 2001/0035428 A1 | 11/2001 | Shipilevsky |
| 2002/0036207 A1 | 3/2002 | Ohuo et al. |
| 2002/0088745 A1 | 7/2002 | Barlow |
| 2003/0102313 A1 | 6/2003 | Weber |
| 2003/0111495 A1 | 6/2003 | Parve et al. |
| 2004/0118770 A1 | 6/2004 | Sale et al. |
| 2004/0182860 A1 | 9/2004 | Wu et al. |
| 2006/0000763 A1 | 1/2006 | Rinker et al. |
| 2006/0043091 A1 | 3/2006 | Pinelli et al. |
| 2006/0163136 A1 | 7/2006 | Patil et al. |
| 2006/0201949 A1 | 9/2006 | Byrd et al. |
| 2007/0102332 A1 | 5/2007 | Bommi et al. |
| 2007/0119772 A1 | 5/2007 | Hiranaga et al. |
| 2007/0151993 A1 | 7/2007 | Yelland |
| 2008/0110820 A1 | 5/2008 | Knipmeyer et al. |
| 2008/0135489 A1 | 6/2008 | Saaski |
| 2008/0203007 A1 | 8/2008 | Jang et al. |
| 2008/0223797 A1 | 9/2008 | Reid et al. |
| 2009/0026218 A1 | 1/2009 | Wong et al. |
| 2009/0057220 A1 | 3/2009 | Nauta |
| 2009/0101617 A1 | 4/2009 | Viggiano |
| 2009/0155436 A1 | 6/2009 | Chalmers et al. |
| 2009/0188884 A1 | 7/2009 | Nelson et al. |
| 2009/0218357 A1 | 9/2009 | Byrd et al. |
| 2010/0219151 A1 | 9/2010 | Risheq |
| 2010/0230345 A1 | 9/2010 | Chen |
| 2011/0117257 A1 | 5/2011 | Sturgess |
| 2011/0217544 A1 | 9/2011 | Young et al. |
| 2011/0303618 A1 | 12/2011 | Cueman et al. |
| 2012/0055862 A1 | 3/2012 | Parekh et al. |
| 2012/0074091 A1 | 3/2012 | Himelstein |
| 2012/0148707 A1 | 6/2012 | Lackey et al. |
| 2012/0187036 A1 | 7/2012 | Risheq |
| 2012/0255890 A1 | 10/2012 | Cumberland |
| 2012/0285961 A1 | 11/2012 | Roth et al. |
| 2012/0298614 A1 | 11/2012 | Nelson |
| 2012/0305559 A1 | 12/2012 | Steininger |
| 2013/0001143 A1 | 1/2013 | Nelson |
| 2013/0032566 A1 | 2/2013 | Lee |
| 2013/0153480 A1 | 6/2013 | Risheq |
| 2013/0233178 A1 | 9/2013 | Herling et al. |
| 2013/0233869 A1 | 9/2013 | Tamarit Rios |
| 2014/0014571 A1 | 1/2014 | Nelson et al. |
| 2014/0048549 A1 | 2/2014 | Wille |
| 2014/0069917 A1 | 3/2014 | Meyers et al. |
| 2014/0069946 A1 | 3/2014 | Gubitosi et al. |
| 2014/0078857 A1 | 3/2014 | Nelson et al. |
| 2014/0083924 A1 | 3/2014 | Bergendal et al. |
| 2014/0124458 A1 | 5/2014 | Sturgess |
| 2014/0144828 A1 | 5/2014 | Chiu |
| 2014/0174965 A1 | 6/2014 | Herling et al. |
| 2014/0216959 A1 | 8/2014 | Raymus et al. |
| 2014/0217056 A1 | 8/2014 | Parekh et al. |
| 2014/0263476 A1 | 9/2014 | Blain et al. |
| 2015/0014252 A1 | 1/2015 | Justus, Sr. |
| 2015/0060495 A1 | 3/2015 | Steinway |
| 2015/0122710 A1 | 5/2015 | Hull et al. |
| 2015/0122725 A1 | 5/2015 | Del Ponte et al. |
| 2015/0166364 A1 | 6/2015 | Wiegele |
| 2015/0250341 A1 | 9/2015 | Liu et al. |
| 2016/0107898 A1 | 4/2016 | Parekh et al. |

FOREIGN PATENT DOCUMENTS

| | | |
|---|---|---|
| EP | 0 345 381 A2 | 12/1989 |
| EP | 2 828 203 B1 | 6/2018 |
| JP | S49-1281 U | 1/1974 |
| JP | H4-6052 A | 1/1992 |
| JP | 3045003 B2 | 5/2000 |
| JP | 2009-169119 A | 7/2009 |
| JP | 2013-116752 A | 6/2013 |
| WO | WO 2008/026208 A2 | 3/2008 |
| WO | WO 2008/036861 A2 | 3/2008 |
| WO | WO 2008/150867 | 12/2008 |
| WO | WO 2010/022353 | 2/2010 |
| WO | WO 2015/139846 A1 | 9/2015 |
| WO | WO 2016/117850 A1 | 7/2016 |
| WO | WO 2017/053588 | 3/2017 |

OTHER PUBLICATIONS

International Search Report dated Jul. 12, 2018 from International Application No. PCT/US2018/023854 filed Mar. 22, 2018 in 25 pages.
BPA-Free Water Bottles dated 2010, found online [Apr. 25, 2014] http://www.greendeals.org/bpa-free-water-bottles.
Hydros 4 Bottle Family Gift Pack dated 2011, found online [Apr. 25, 2011] http://www.hydrosbottle.com/shop/hydros-5pack.html.
Hydros Bottle on amazon dated Oct. 27, 2010, found online [Apr. 25, 2017], https://www.amazon.com/Hydros-Bottle-Filtering-Social-Mission/dp/B003QJ31JO.
Hydros Filtering Water Bottles dated Sep. 19, 2011, found online [Apr. 25, 2015] http://www.onlineprnews.com/news/169792-1316453211-hydros-filtering-water-bottles-show-how-sustainability-is-sexy-at-natural -products-expo-east.html.
International Search Report dated Jan. 22, 2013 from International Application No. PCT/US2012/056642 filed Sep. 21, 2012 in 2 pages.
International Search Report dated Feb. 7, 2017 from International Application No. PCT/US2016/053147 filed Sep. 22, 2016 in 22 pages.
U.S. Appl. No. 61/126,589, filed May 6, 2008 by Mittal.
U.S. Appl. No. 61/189,540, filed Aug. 21, 2008 by Mittal.
U.S. Appl. No. 61/203,661, filed Dec. 26, 2008 by Mittal.
Ubergizmo, "Binibottle design is revolutionary," Oct. 10, 2007, p. 1 [online] <URL: http://www.ubergizmo.com/2007/10/binibottle-design-is-revolutionary/> [retrieved Dec. 23, 2014].
Website: 3-2-1 water (www.321-water.com) accessed on Sep. 2, 2011.
Website: Aquamira (www.aquamira.com) accessed on Sep. 2, 2011.
Website: Clear2O (www.clear2o.com) accessed on Sep. 2, 2011.
Website: Enviro Products (www.newwaveenviro.com) accessed on Sep. 2, 2011.
Website: Fit & Fresh Livpure Bottle (www.fit-fresh.com/products/livpure) accessed on Sep. 2, 2011.
Website: Guyot Tapguard (www.guyotdesigns.com) accessed on Sep. 2, 2011.
Website: Pure Hydration Aquapure Travel (www.bwtechnologies.com/aquapure_traveller.html) accessed on Sep. 2, 2011.

(56) References Cited

OTHER PUBLICATIONS

Website: Seychelle (www.seychelle.com) accessed on Sep. 2, 2011.
Website: Water Bobble (www.waterbobble.com) accessed on Sep. 2, 2011.
Extended European Search Report dated May 10, 2019, for European Application No. 16849609.9, 9 pages.
Japanese Office Action dated Nov. 17, 2020, for Japan Application No. 2018-535820, with English translation, 27 pages.
Australian Office Action dated Mar. 30, 2021 in Australian Patent Application No. 2016325546, 7 pages.
Japanese Office Action dated Jul. 6, 2021, for Japan Application No. 2018-535820, with English translation, 27 pages.

* cited by examiner

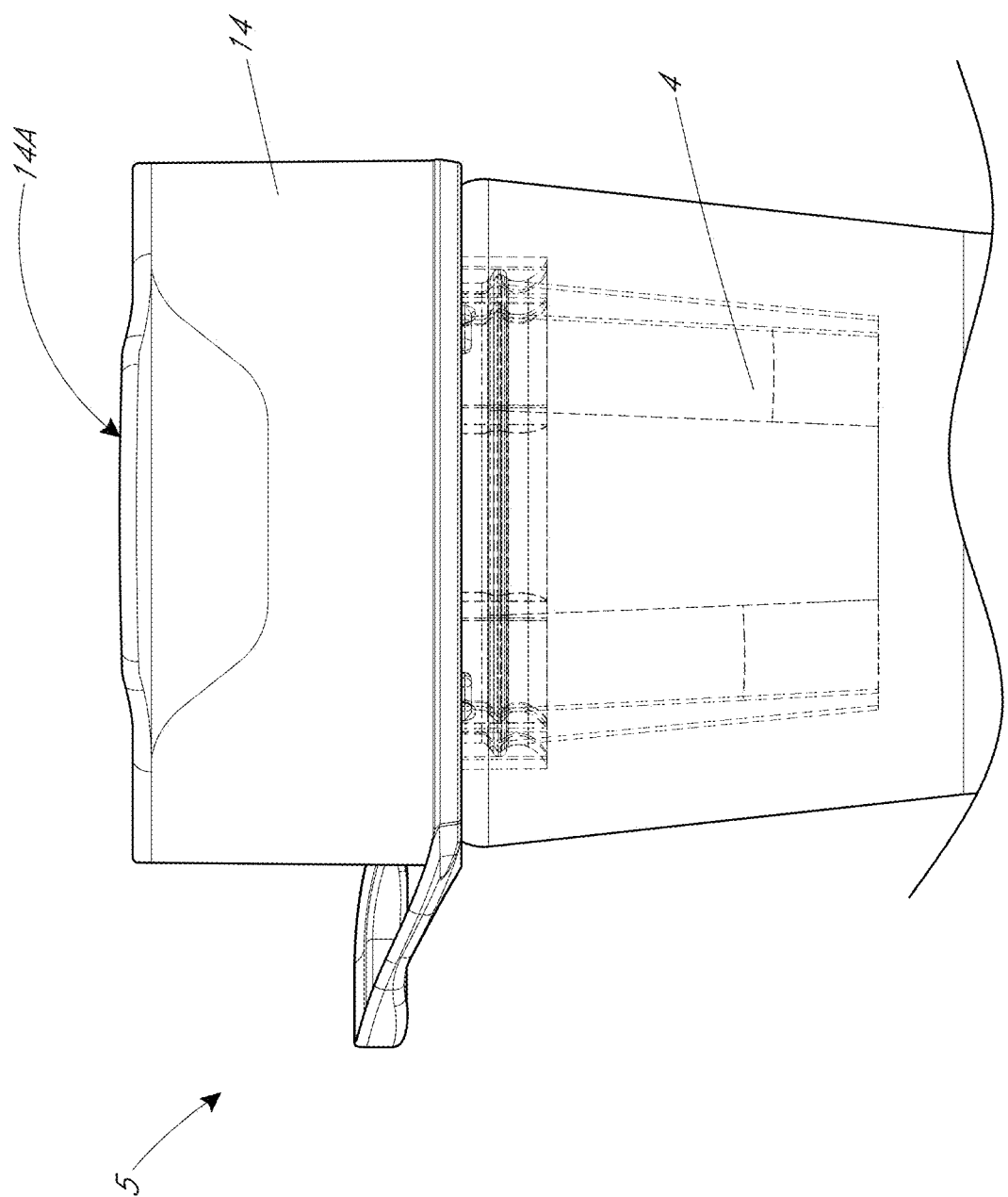

Outlet

Inlet

GRAVITY-FLOW FILTER ASSEMBLY

CROSS-REFERENCE TO RELATED APPLICATIONS

This application claims priority to U.S. Provisional Application No. 62/232,334, filed Sep. 24, 2015, the entire contents of which are hereby incorporated by reference herein in their entirety and for all purposes.

BACKGROUND

Field

The field relates generally to a gravity-flow filter assembly that can be used with a bottle, pitcher, or other vessel for filtering liquid.

Description of the Related Art

Conventional water bottles, pitchers, and/or other containers for holding water or other liquids (e.g., juices, etc.) may not include a filter for removing contaminants from the water before drinking. For example, some water bottles and pitchers may include only a container and a single lid. The user may fill the container by pouring water from a sink or other source through the lid and into the bottle. However, the water may include contaminants, such as chlorine and other chemicals, which may be unhealthy or undesirable for the user. Thus, in many instances, it can be desirable to provide a filter which can remove some or all of the contaminants from water before the user drinks the water. Furthermore, to improve the user's experience with the bottle or pitcher, it can be desirable to filter the water at a sufficiently high flow rate such that the container can be filled in a relatively short amount of time. Thus, there remains a continuing need for filter assemblies that can be used in conjunction with water bottles, pitchers, and other containers to filter water or other liquids effectively and at a high flow rate.

SUMMARY

In one embodiment, an apparatus for dispensing a liquid is disclosed. The apparatus can include a cap configured to connect to a container body having a chamber for containing the liquid. The cap can include a fill aperture through which the liquid is supplied to the container body. The cap can include a pour aperture through which the liquid exits the apparatus. A fill lid can be rotatable about a pivot axis in a first direction to close the fill aperture and rotatable about the pivot axis in a second direction to open the fill aperture. The first direction can be opposite the second direction. The pivot axis can be disposed non-parallel to a longitudinal axis of the apparatus. A pour lid can be rotatable about the pivot axis in the first direction to open the pour aperture and rotatable about the pivot axis in the second direction to close the pour aperture.

In another embodiment, an apparatus for containing a liquid is disclosed. The apparatus can include a container body comprising a chamber for containing the liquid. The apparatus can include a cap which connects to an upper portion of the container body. The cap can include a platform having a top side and a bottom side opposite the top side. A sidewall can extend transversely from the bottom side of the platform, the sidewall defining a recess sized and shaped to receive a filter assembly, the sidewall and recess disposed within the chamber of the container body. A first vent can be provided through the sidewall to provide fluid communication between the chamber of the container body and the recess. A second vent can be provided through the platform to provide fluid communication between the recess and the outside environs.

In another embodiment, an apparatus for containing a liquid is disclosed. The apparatus can include a container body comprising a chamber for containing the liquid. A cap can connect to an upper portion of the container body, the cap comprising a fill aperture through which the liquid is supplied to the a chamber. A filter assembly can be coupled with the cap, the filter assembly comprising filtration media to filter the liquid. A diffuser can be disposed between the filter assembly and the fill aperture. The diffuser can comprise a diffuser body and one or a plurality of openings. The diffuser can be configured to diffuse the supplied liquid laterally before the liquid passes to the filter assembly.

In another embodiment, filter assembly comprises a sleeve comprising a first opening, a second opening, and an annular wall extending between the first opening and the second opening to define a filter cavity. A mesh filter cartridge can be disposed in the filter cavity. Filtration media can be disposed within the mesh filter cartridge.

In another embodiment, a filter cartridge for a liquid container is disclosed. The filter cartridge can comprise a stainless steel mesh basket comprising a top mesh filter pad, a bottom mesh filter pad, and a mesh wall extending between the top mesh filter pad and the bottom mesh filter pad. The filter cartridge can comprise filtration media disposed within the stainless steel mesh basket.

In another embodiment, a filter assembly can comprise a filter body coupled to or formed with a top filter pad and a bottom filter pad. In some embodiments, the filter body can comprise a polymer. In some embodiments, the filter body can comprise stainless steel. In some embodiments, the mesh size of the bottom filter pad can be finer (e.g., smaller openings) than the mesh size of the top filter pad. In some embodiments, the pore size of the top mesh filter pad (or filter inlet) can be in a range of 0.01 inches to 0.1 inches, or more particularly, in a range of 0.04 inches to 0.07 inches, in a range of 0.015 inches to 0.06 inches, or in a range of 0.018 inches to 0.057 inches. The pore size of the bottom mesh filter pad (or filter outlet) can be in a range of 0.001 inches to 0.03 inches in a range of 0.015 inches to 0.06 inches, or in a range of 0.018 inches to 0.057 inches. In some embodiments, the pores may comprise between 60% and 80% of the overall area of the top filter pad, e.g., between 64% and 75% of the overall area. In some embodiments, the pores may comprise between 55% and 65% of the overall area of the bottom filter pad. Any suitable type of filtration media (such as granular activated carbon) can be disposed within the filter body.

For purposes of summarizing advantages achieved over the prior art, certain objects and advantages have been described herein. Of course, it is to be understood that not necessarily all such objects or advantages may be achieved in accordance with any particular embodiment. Thus, for example, those skilled in the art will recognize that principles taught herein may be embodied or carried out in a manner that achieves or optimizes one advantage or group of advantages as taught or suggested herein without necessarily achieving other objects or advantages as may be taught or suggested herein.

All of these embodiments are intended to be within the scope of the disclosure. These and other embodiments will become readily apparent to those skilled in the art from the following detailed description of the disclosed embodiments having reference to the attached figures.

BRIEF DESCRIPTION OF THE DRAWINGS

These aspects and others will be apparent from the following description of various embodiments and the accompanying drawings, which are meant to illustrate and not to limit the disclosed embodiments, wherein:

FIG. 4D is a schematic side view of a cap having a rim with a raised rim region proximate the pour aperture.

DETAILED DESCRIPTION

Various embodiments disclosed herein relate to a gravity-flow filter assembly, a cap which couples to the filter assembly, and a container to which the cap is attached. The cap can include a fill aperture and fill lid which can selectively open and close the fill aperture by way of rotation about a pivot axis that is non-parallel to a longitudinal axis of the apparatus. The cap can also include a pour aperture and a pour lid which can selectively open and close the fill aperture by way of rotation about the pivot axis. The apparatus can include a plurality of vents that improve the airflow to the apparatus during filling and/or pouring. Beneficially, the filter assembly can reduce contaminants (e.g., chlorine in water by at least 50% (e.g., by at least 75%) at relatively high flowrates (e.g., at flowrates in a range of 0.5 Lpm to 3 Lpm (e.g., in a range of 1 Lpm to 2.5 Lpm). It should be appreciated that although the filter assemblies disclosed herein may be described in connection with the filtering of water in some embodiments, the components described herein may also be used with other liquids (e.g., juices, etc.). Moreover, the components described herein (e.g., the cap and/or filter assembly) may be used with any suitable type of container, such as a bottle, a carafe, a pitcher, a cup, etc.

Figure 1A:
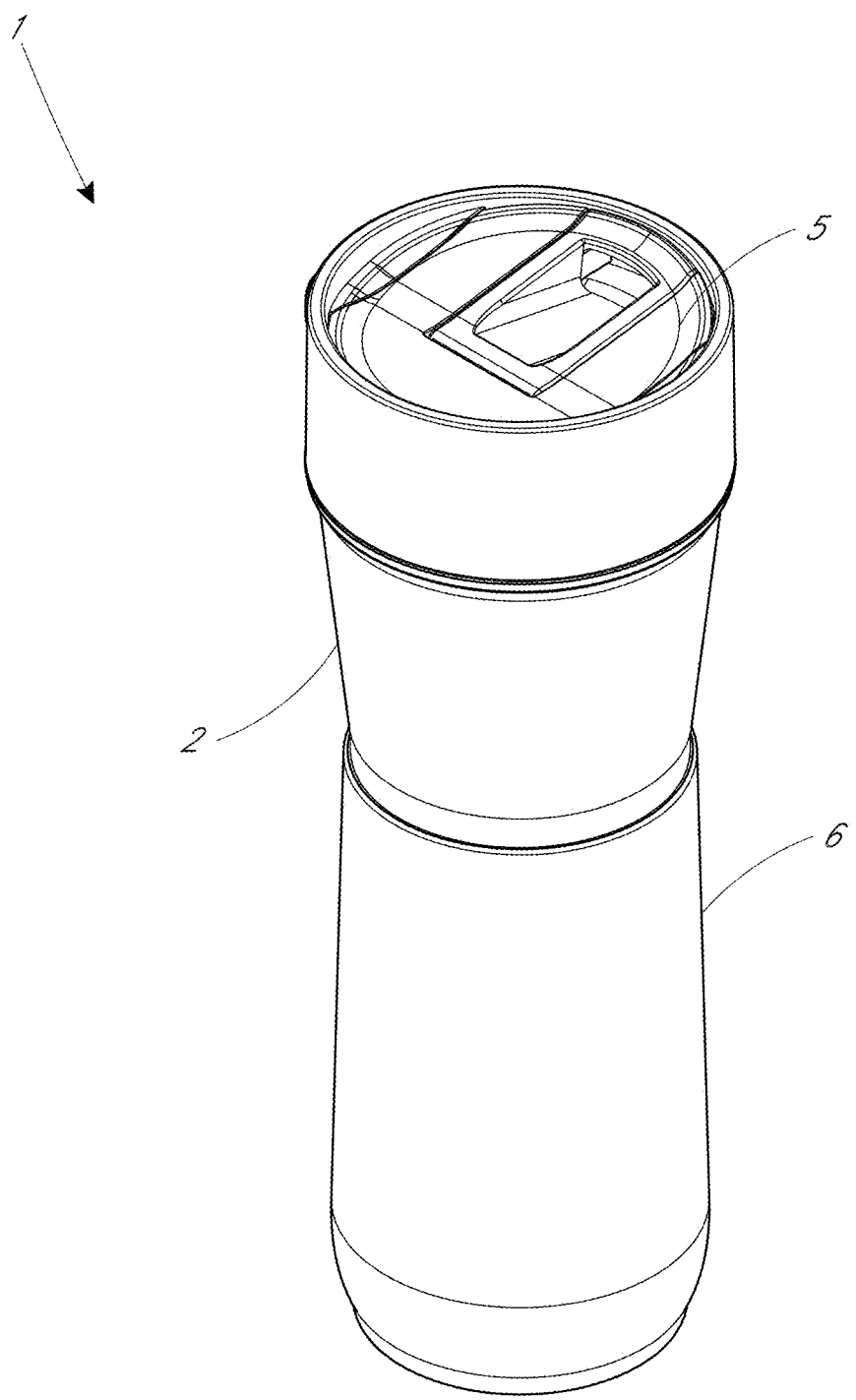
FIG. 1A is a perspective view of a container comprising a bottle, according to one embodiment.
Figure 1B:
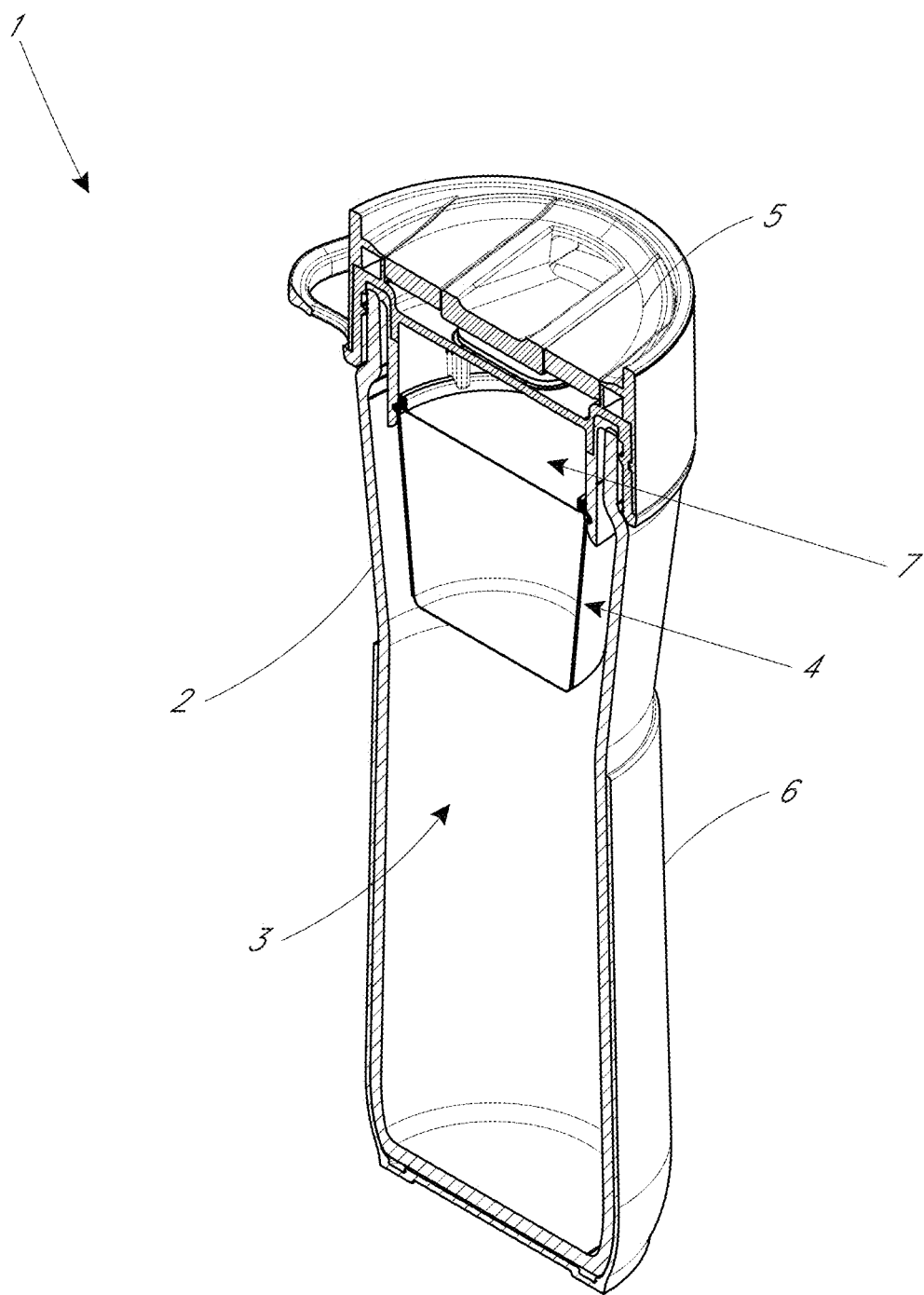
FIG. 1B is a perspective sectional view of the water bottle shown in FIG. 1A.

FIG. 1A is a perspective view of a container 1 comprising a bottle (e.g., a water bottle), according to one embodiment. FIG. 1B is a perspective sectional view of the bottle shown in FIG. 1A. The container 1 can comprise a container body 2 having a chamber 3 for containing a liquid, such as water. A cap 5 can be removably attached to the container body 2, e.g., by way of a threaded connection. In addition, as shown in FIG. 1B, a filter assembly 4 can be removably connected to the cap 5. The cap 5 and/or filter assembly 4 can be used with any suitable container or vessel, such as a bottle, a pitcher, a carafe, a cup, etc. In operation, as described in additional detail below, the user can open a fill lid and can supply water or other liquid to be filtered through a fill aperture to an internal reservoir 7 disposed above the filter assembly 4. The water can be drawn downwardly by gravity and can flow from the internal reservoir 7 down through the filter assembly 4 and into the chamber 3. Beneficially, unlike other devices, the embodiments disclosed herein can filter water by using gravity (e.g., by pouring liquid downwardly into the cap 5 and filter assembly), without applying pressure (e.g., without squeezing the container). The filter assembly 4 can remove contaminants from the water (e.g., chlorine and other chemicals) before the water enters the chamber 3 of the container body 2. The user can tilt the container 1 and activate a pour or drink lid, as explained in more detail below, to enable the water to pass from the chamber 3 and out of the container 1, for example, to the user's mouth.

The container body 2 may be any suitable size and shape. For example, it can be advantageous to provide a bottle (e.g., a water bottle) which is sufficiently small to enable the user to easily carry the bottle, while sufficiently large to contain enough liquid for drinking. The container body can have a volume in a range of 400 mL to 750 mL, e.g., about 500 mL in some embodiments. In other embodiments, the container body 2 can have a volume of about 650 mL. As explained herein, other types of containers or vessels, such as a pitcher, may be used in conjunction with the embodiments disclosed herein. Furthermore, the container (e.g., bottle, pitcher, etc.) may be any suitable size.

The container body 2 can be any suitable material. In various embodiments, the container body 2 can comprise plastic, glass, or any other suitable material. As shown in FIG. 1A, a protective coating 6 may be applied over the bottom portion of the container body 2. The protective coating 6 may comprise a polymer material, such as silicone or a thermoplastic elastomer (TPE). In some embodiments, the protective coating 6 may comprise a pre-molded (e.g., injection molded) boot which can be pulled over the bottom end of the container body 2. In other embodiments, the protective coating 6 can be overmolded over the container body 2. The protective coating 6 may cover substantially the entire container body 2 in some arrangements. In other arrangements, the protective coating 6 may only be applied over the lower portion of the container body 2. The protective coating 6 may protect the container 1 from external forces, e.g., forces or impulses which result from the user dropping the container 1 on a hard surface. The protective coating 6 may be sufficiently thick so as to dissipate the impact forces on the bottle to prevent the container 1 from breaking or cracking. Furthermore, if the container body 2 were to break, the protective coating 6 can advantageously contain any broken shards of glass or plastic within the coating 6 to reduce the risk of injury to the user and/or to enable efficient cleanup.

Figure 2A:
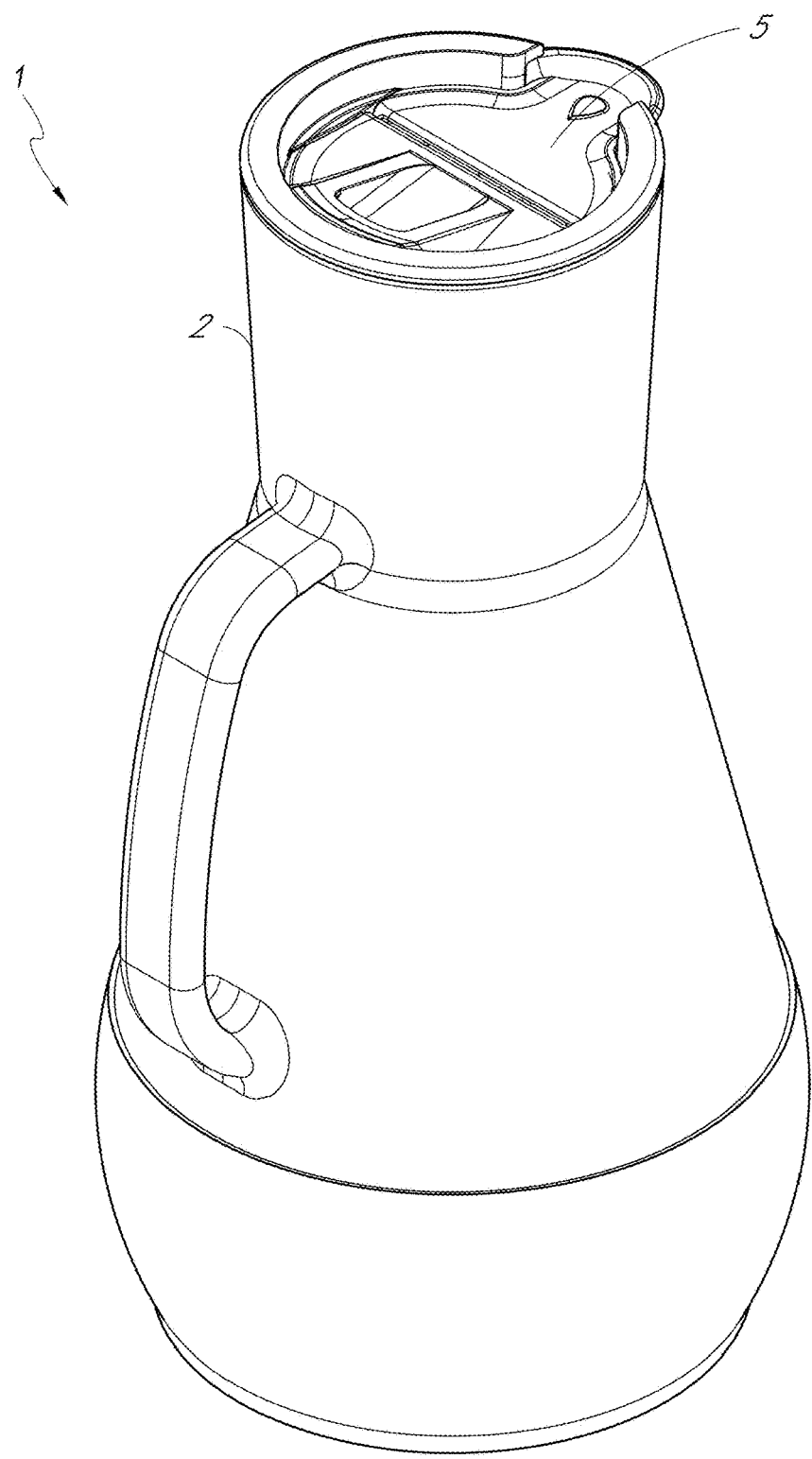
FIG. 2A is a perspective view of a container comprising a water pitcher, according to another embodiment.
Figure 2B:
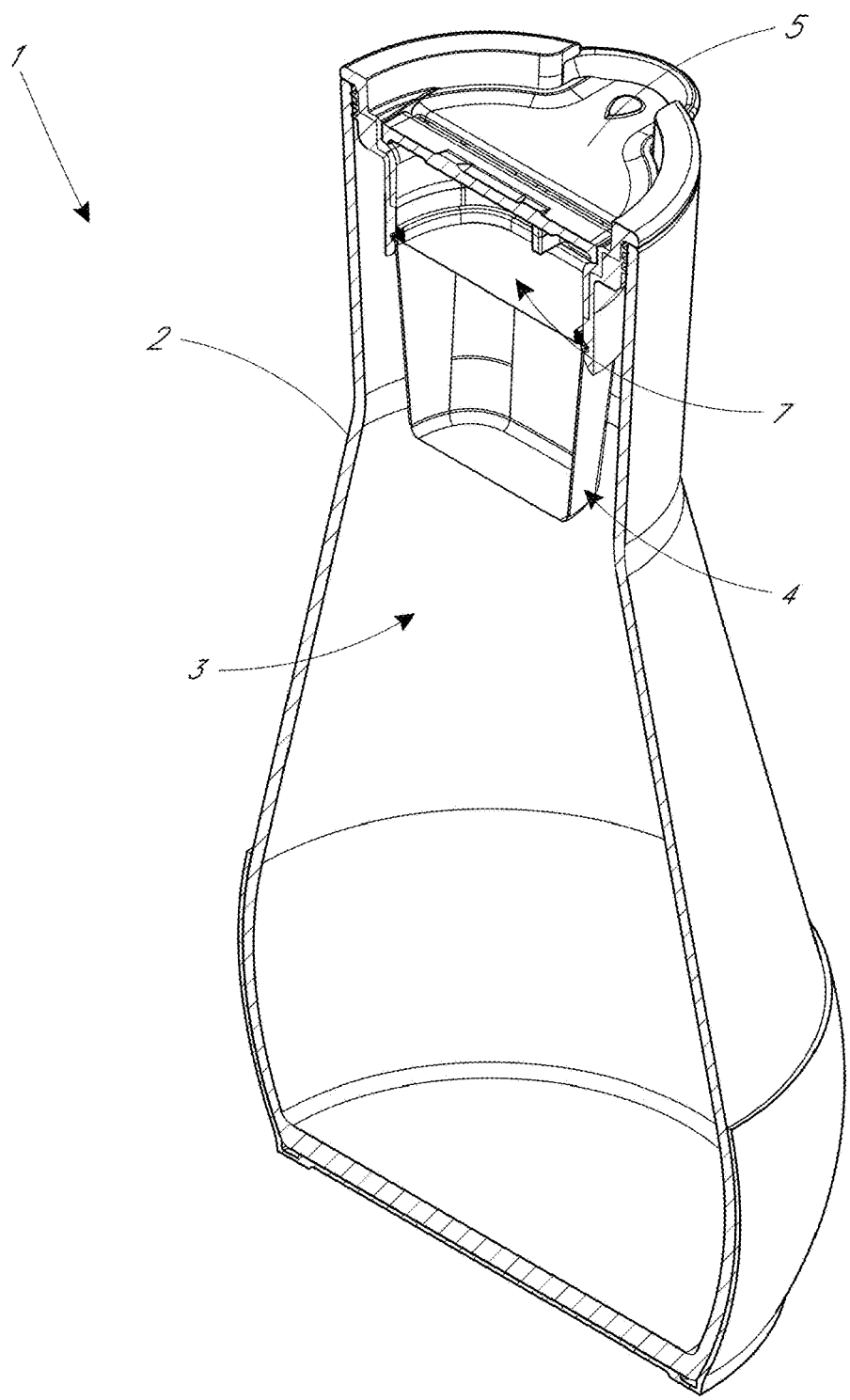
FIG. 2B is a perspective sectional view of the pitcher shown in FIG. 2A.
Figure 2C:
FIG. 2C is a schematic perspective view of a container comprising a carafe, according to various embodiments.

FIG. 2A is a perspective view of a container 1 comprising a pitcher, according to another embodiment. FIG. 2B is a perspective sectional view of the pitcher shown in FIG. 2A. FIG. 2C is a schematic perspective view of a container 1 comprising a carafe, according to various embodiments. Unless otherwise noted, reference numerals in FIGS. 2A-2C generally refer to similar components as like reference numerals in FIGS. 1A-1B. Unlike the embodiment of FIGS. 1A-1B, however, the container 1 of FIGS. 2A-2B comprises a pitcher, which may contain larger amounts of liquid than the bottle of FIGS. 1A-1B. In FIG. 2C, the container 1 comprises a carafe. In FIGS. 2A-2C, for example, the container 1 can comprise a cap 5 removably attached to a container body 2 having a chamber 3. As with the embodiment of FIGS. 1A-1B, a filter assembly 4 can removably connect to the cap 5, and an internal reservoir 7 can be disposed above the filter assembly 4. The cap 5 and filter assembly 4 of FIGS. 2A-2C may be substantially similar in design to the cap 5 and filter assembly 4 shown in FIGS. 1A-1B, such that the cap 5 and filter assembly 4 can be used in bottles, pitchers, and/or carafes. In other embodiments, the cap 5 and filter assembly 4 for use with a pitcher and/or carafe may be similar to the cap 5 and filter assembly 4 for the bottle, except the dimensions may be different to accommodate the different sizes of the pitcher and/or carafe. As with the bottle of FIGS. 1A-1B, the container body 2 may comprise plastic or glass. In some embodiments, a protective coating may also be applied over the container body 2 to protect the container 1 from damage and/or to contain any broken pieces of the container body 2.

Figure 3B:
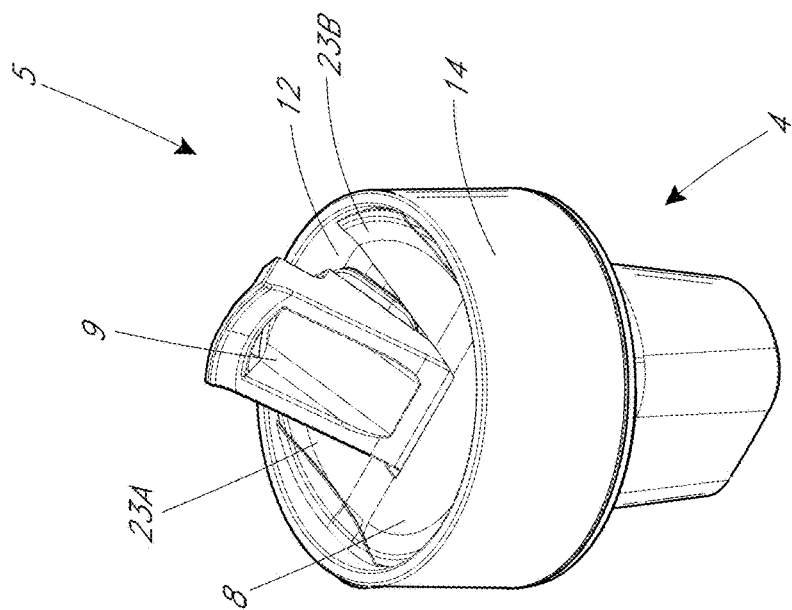
FIG. 3B is a schematic perspective view of the cap shown in FIG. 3A.
Figure 3A:
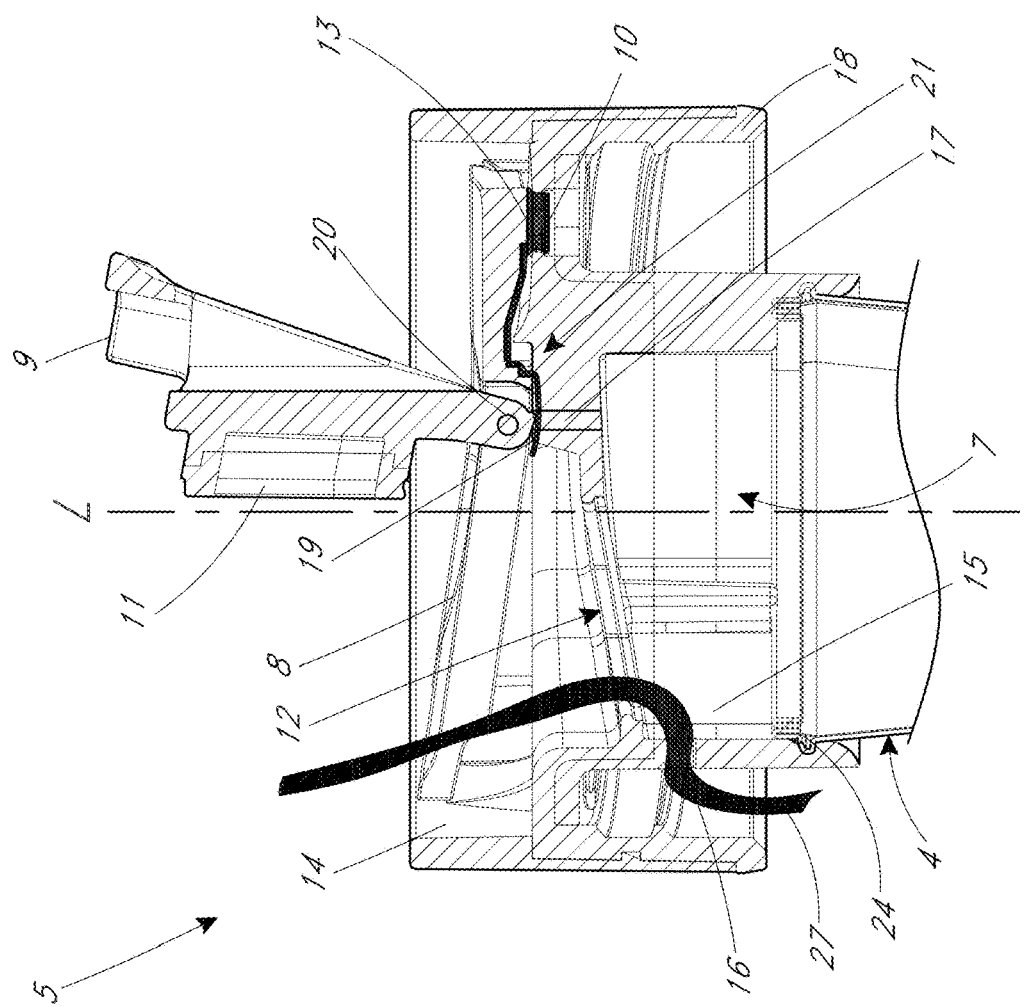
FIG. 3A is a side cross-sectional view of a cap, shown in a filling configuration, in accordance with various embodiments.

FIG. 3A is a side cross-sectional view of the cap 5, shown in a filling configuration in which liquid (e.g., water) can be supplied to the reservoir 7 above the filter assembly 4. As shown in FIG. 3A, the cap 5 can include a fill aperture 12 and a fill lid 9 configured to open and close the fill aperture 12. In addition, as explained below, the cap 5 can also include a drinking or pour aperture 10 and a pour lid 8 configured to open and close the pour aperture 10. The fill lid 9 and the pour lid 8 can be rotatable about a common pivot axis 20. The pivot axis 20 can be non-parallel to (e.g., transverse to) a longitudinal axis L of the cap 5. As illustrated, the longitudinal axis L can be disposed along or generally parallel to a direction extending from an upper end of the cap 5 to a lower end of the container 2. The fill lid 9 can be rotatable about the pivot axis 20 in a first direction to close the fill aperture 12 and rotatable about the pivot axis 20 in an opposite second direction to open the fill aperture 12. Similarly, the pour lid 8 can be rotatable about the pivot axis 20 in the first direction to open the pour aperture 10 and rotatable about the pivot axis 20 in the second direction to close the pour aperture 10. The pour lid 8 and fill lid 9 can rotate about the same axis 20 but can rotate independently of one another, such that rotation of one of the pour lid 8 and the fill lid 9 does not cause the other to rotate.

A first gasket 11 can be coupled to or formed with the fill lid 9 and can comprise a rubber or polymeric material to substantially seal the fill aperture 12 when the fill lid 11 closes the fill aperture 12. A second gasket 13 can be coupled to or formed with the pour lid 8 and can comprise a rubber or polymeric material to substantially seal the pour aperture 10 when the pour lid 9 closes the pour aperture 10. As shown in FIG. 3B, the pour lid 8 can comprise first and second arms 23A, 23B disposed on opposing sides of the fill lid 9. As explained in more detail below, the user can press downwardly against one or both arms 23A, 23B to open the pour lid 8 and drink or pour water from the container body 2.

As shown in FIGS. 3A-3B, the cap 5 can include a rim 14 extending upwardly above a platform 21. To fill the container, the user can flip open the fill lid 9 and pour liquid through the fill aperture 12 and into the reservoir 7. The liquid (e.g., unfiltered water) can flow through the filter assembly 4 and into the chamber 3 of the container body 2. In FIG. 3A, a sidewall 15 can extend downwardly from a bottom side of the platform 21. The sidewall 15 can at least partially define a recess sized and shaped to receive the filter assembly 4. As explained in more detail below, the filter assembly 4 can connect to the sidewall 15 by snapping into an annular groove 24 formed in a bottom portion of the sidewall 15. In some arrangements, part or all of the sidewall 15 can comprise a polymer or rubber material, and can be deformed so as to tightly accommodate and receive the filter assembly 4. In addition, as shown in FIG. 3A, an outer wall 18 can extend downwardly from the platform 21 such that the sidewall 15 and the recess (which also defines the reservoir 7) are disposed within the chamber 3 of the container body 2. The outer wall 18 can comprise one or more connectors (e.g., threads) to connect to corresponding connectors on the upper end portion of the container body 2.

In addition, a first vent 16 can be disposed through the sidewall 15. A second vent 17 can be disposed through a portion of the platform 21. In the filling configuration, as shown in FIG. 3A, liquid can be supplied to the chamber 3 of the container body 2 by way of the fill aperture 12, the reservoir 7, and filter assembly 4. As the liquid enters the chamber 3 of the container body 2, air 27 within the chamber 3 may be displaced out of the container 1 by way of the first vent 16. The first vent 16 may therefore enable the air 27 to pass from the chamber 3, through the first vent 16 by way of a gap defined between the outer wall 18 and the sidewall 15, and out of the container 1 by way of the fill aperture 12. The first vent 16 can therefore assist in the efficient filling of the chamber 3. As shown in FIG. 3A, in the filling configuration, the second vent 17 may be closed or occluded by a vent gasket 19 disposed on the pour lid 8.

Figure 3C:
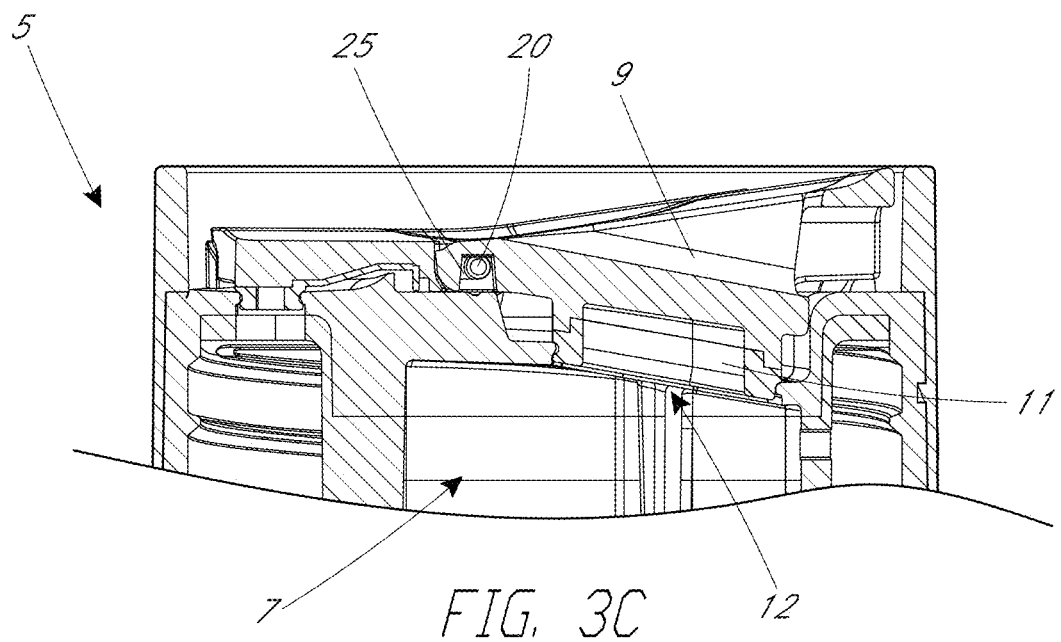
FIG. 3C is a magnified side sectional view of the cap with a fill lid in a closed configuration.
Figure 3D:
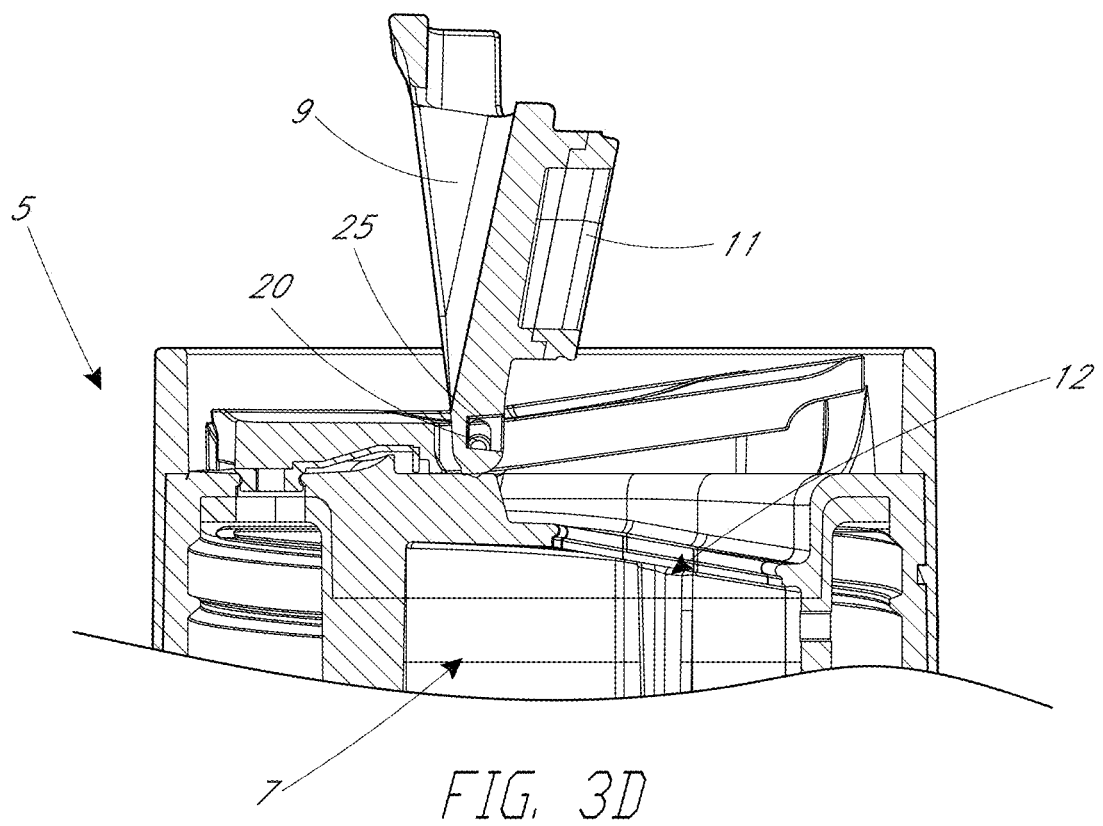
FIG. 3D is a magnified side sectional view of the cap with the fill lid in a filling configuration.

FIG. 3C is a magnified side sectional view of the fill lid 9 in a closed configuration, for example, when the cap 5 is in a pouring configuration or when both the fill lid 9 and pour lid 8 are closed. FIG. 3D is a magnified side sectional view of the fill lid 9 in the filling configuration. As illustrated in FIGS. 3C-3D, to fill the container 1, the user may flip up the fill lid 9 by rotating the fill lid 9 about the pivot axis 20. In addition, the pivot axis 20 may correspond to a pin disposed within an elongated slot 25. The slot 25 may be larger than the pin such that the pin (and pivot axis 20) can translate in a direction transverse to the direction of the pivot axis 20.

Figure 4A:
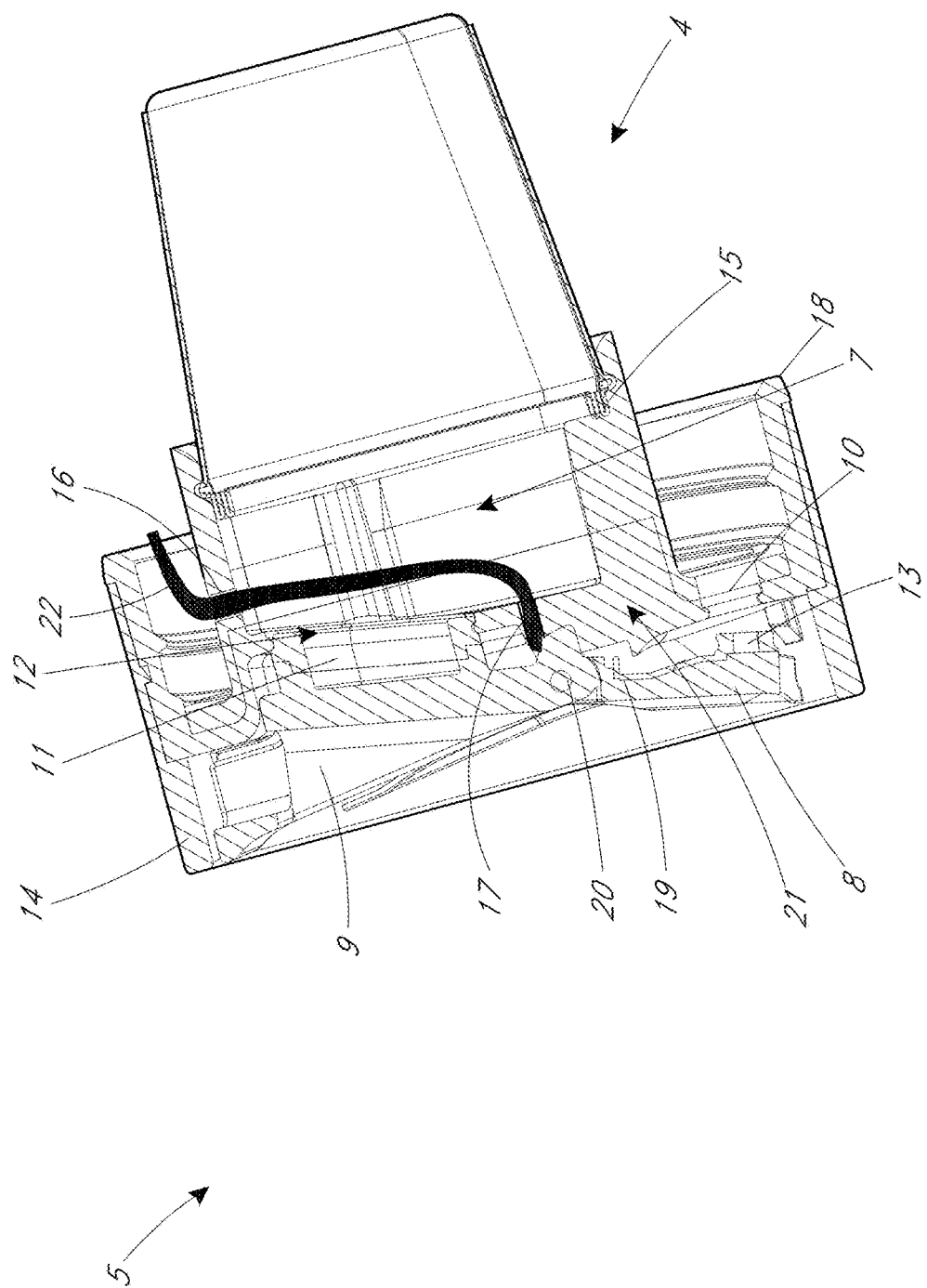
FIG. 4A is a side cross-sectional view of the cap in a pouring or drinking configuration.
Figure 4B:
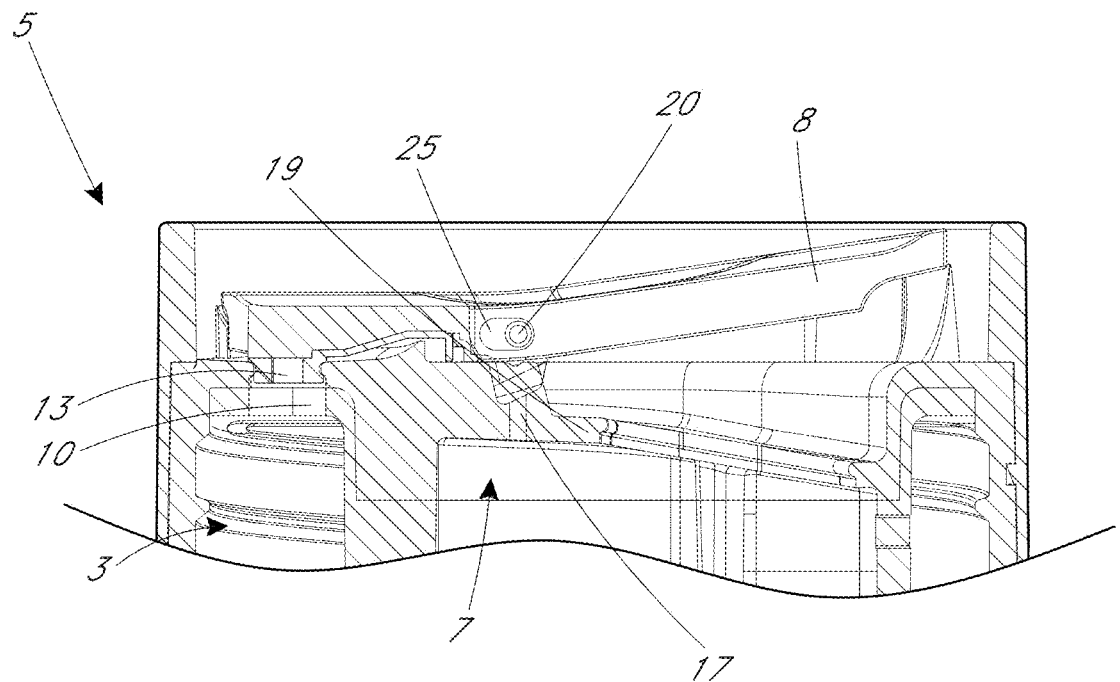
FIG. 4B is a magnified side cross-sectional view of a cap having a pour lid, illustrated with the pour lid in a closed configuration.
Figure 4C:
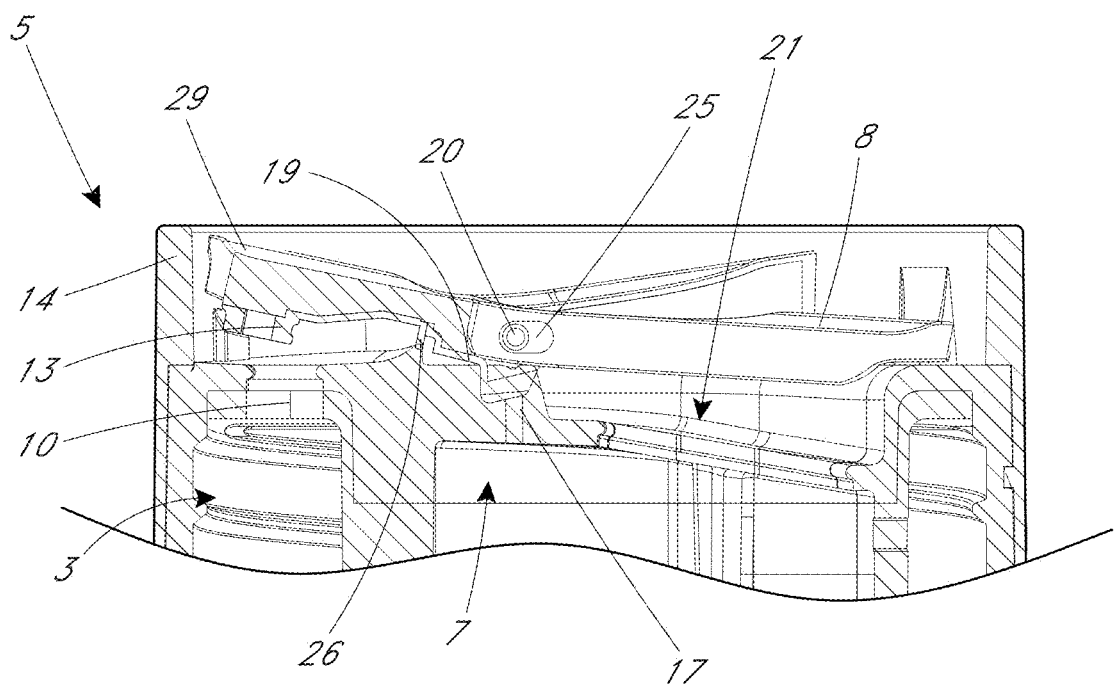
FIG. 4C is a magnified side cross-sectional view of the cap with the pour lid in an open or pouring configuration.

FIG. 4A is a side cross-sectional view of the cap 5 in a pouring or drinking configuration. FIG. 4B is a magnified side cross-sectional view of the pour lid 8 when the pour lid 8 is in a closed configuration (e.g., when the cap 5 is in a filling configuration or when both the fill lid 9 and the pour lid 8 are closed). FIG. 4C is a magnified side cross-sectional view of the pour lid 8 when the pour lid 8 is in an open or pouring configuration. To drink or pour from the container 1, the user may press downwardly against one or both arms 23A, 23B of the pour lid 8 (see FIG. 3B) to cause the pour lid 8 to rotate about the pivot axis 20. The pour lid 8 may also translate along the slot 25 such that a distal end 29 of the pour lid 8 abuts against the rim 14 of the cap 5. The distal end 29 can abut the rim 14 so as to provide a fluid seal such that liquid passing through the pour aperture 10 passes directly into the user's mouth or other container, instead of spilling outwardly along the periphery of the cap 5. Furthermore, in the pouring configuration, a gasket barrier 26 can abut against a corner of the platform 21 to prevent water from passing from the reservoir 7 to the user by bypassing the filter assembly 4. The gasket barrier 26 can thereby prevent the mixing water or air between the reservoir 7 and the chamber 3.

In FIG. 4B, when the cap 5 is in a closed configuration, the vent gasket 19 can substantially close the second vent 17. However, as shown in FIGS. 4A and 4C, when in the pouring configuration, the vent gasket 19 is rotated and translated relative to the second vent 17 such that the second vent 17 is open. As depicted in FIG. 4A, air 22 from the outside environs can enter through the second vent 17, into the reservoir 7, and through the first vent 16 into the chamber 3 of the container body 2. The air flow 22 can assist in displacing the liquid in the chamber 3 to cause the liquid to smoothly and rapidly exit the pour aperture 10. Thus, in the pouring configuration, the first and second vents 16, 17 can be open so as to enable efficient liquid flow out of the container 1. In some embodiments, no additional external vent holes may be used.

FIG. 4D is a schematic side view of a cap 5 having a rim 14 with a raised rim region 14A proximate the pour aperture 10, according to some embodiments. The raised rim region 14A can beneficially provide the user with a visual cue as to the location of the pour aperture 10 to improve the usability of the cap 5. Moreover, the raised rim region 14A can provide an improved liquid seal near the corners of the distal end 29 of the pour lid 8 so as to provide a better seal when the distal end 29 abuts the rim 14 (see FIG. 4C).

Figure 4E:
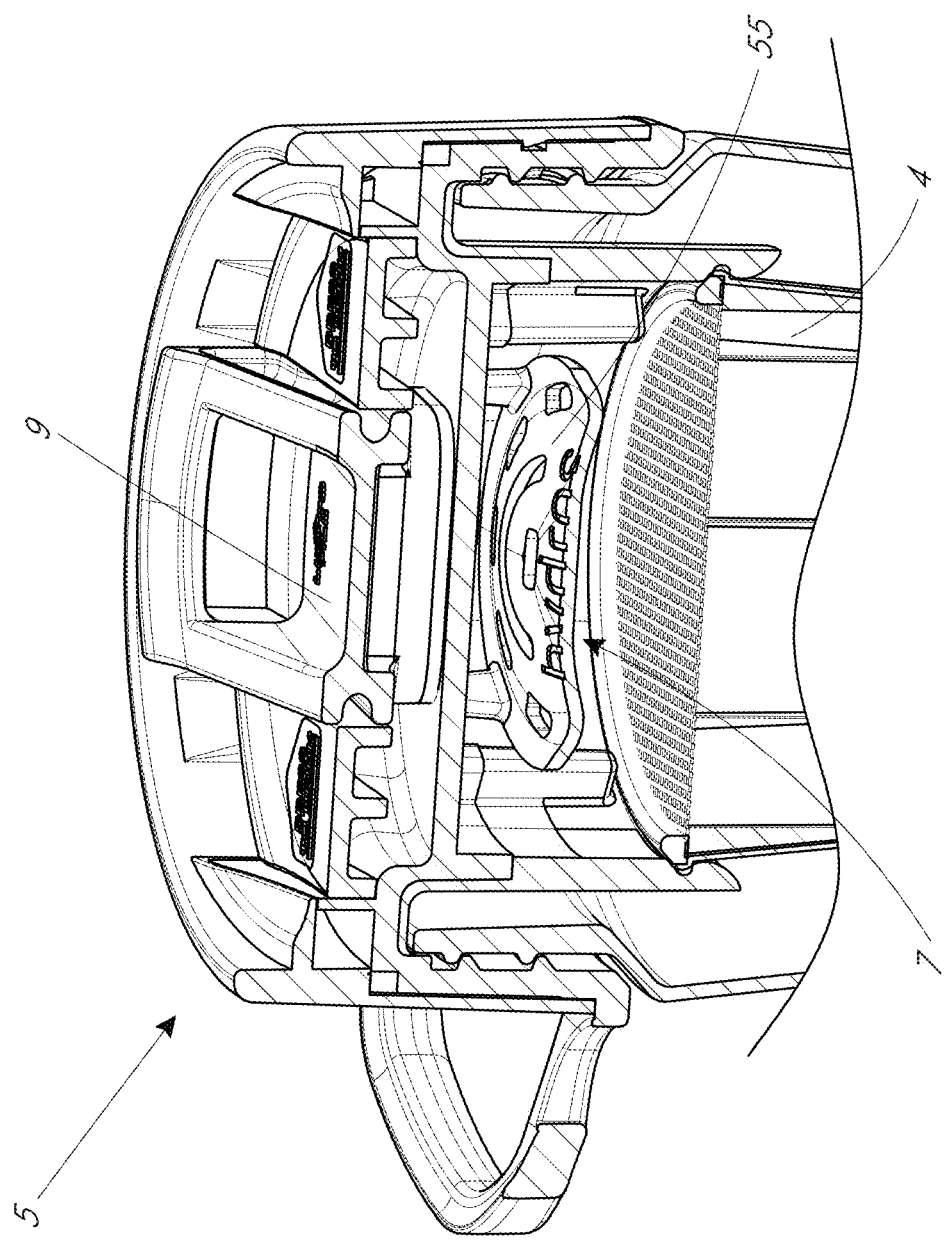
FIG. 4E is a schematic side sectional view of a cap having a diffuser disposed above the filter assembly, according to various embodiments.
Figure 4F:
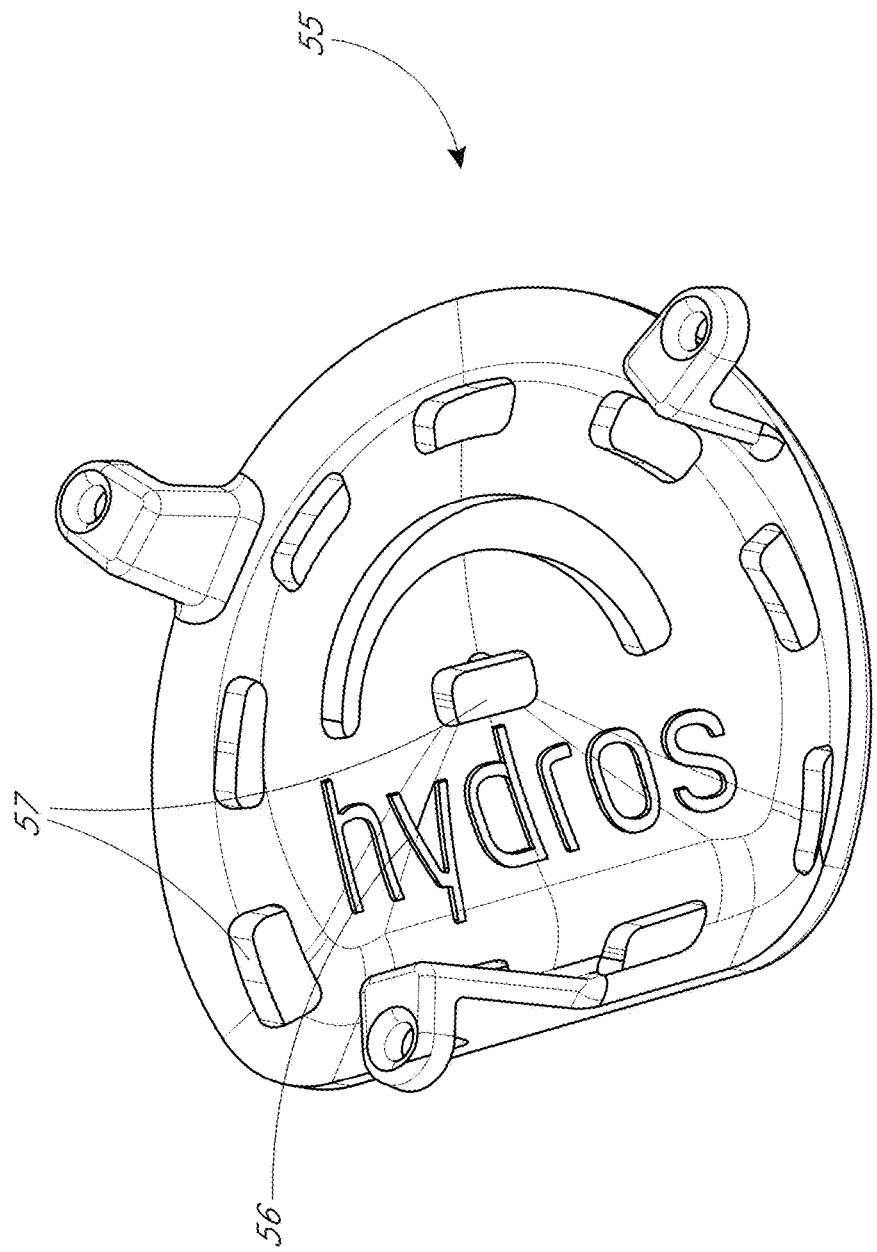
FIG. 4F is a schematic perspective view of the diffuser.

FIG. 4E is a schematic side sectional view of a cap 5 having a diffuser 55 disposed above the filter assembly 4, according to various embodiments. FIG. 4F is a schematic perspective view of the diffuser 55. In some arrangements without a diffuser, when liquid is supplied to the reservoir 7 by way of the fill aperture 12, the stream of liquid may bore through the filtration media within the filter assembly 4. The stream may displace the filtration media, which may reduce the effectiveness of the filter assembly 4 in filtering water. Accordingly, the diffuser 55 may be placed above the filter assembly 4 (e.g., within the reservoir 7) so as to disperse the liquid before the liquid enters the filter assembly. For example, as shown in FIGS. 4E-4F, the diffuser 55 may comprise a diffuser body 56 having one or a plurality of diffuser openings 57 therein. In the illustrated embodiment, for example, the diffuser body 56 comprises a plurality of openings 57 spaced laterally along the diffuser body 56. In other embodiments, however, there may be one elongate hole that extends laterally through the diffuser body 56 to diffuse the liquid laterally across the diffuser 55 prior to the liquid entering the filter assembly 4. In some embodiments, the diffuser 55 can comprise a molded plastic body. As liquid enters the reservoir 7, the liquid may impinge upon the diffuser body 56 and can spread or diffuse the liquid stream out laterally. The diffused liquid can pass through the diffuser openings 57 and into the filter assembly 4. Beneficially, the diffuser 55 can lower the downward momentum of the liquid as it enters the filter assembly 4, which can reduce or eliminate the boring effect described above and can improve the filtering capabilities of the filter assembly 4.

Figure 5B:
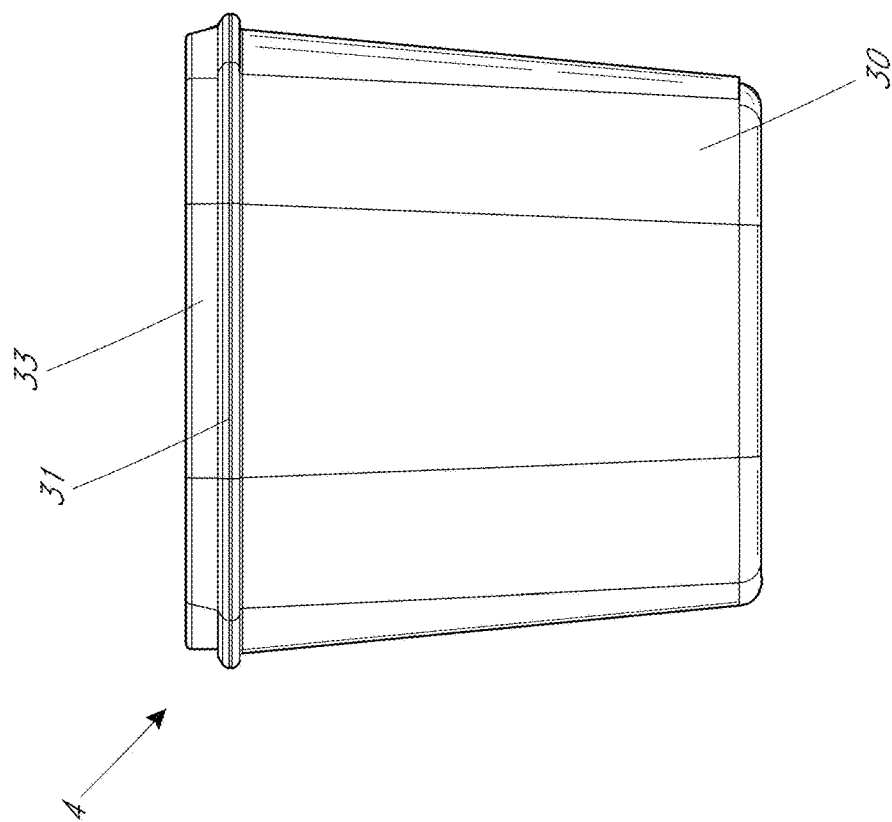
FIG. 5B is a schematic side view of the filter assembly of FIG. 5A.
Figure 5A:
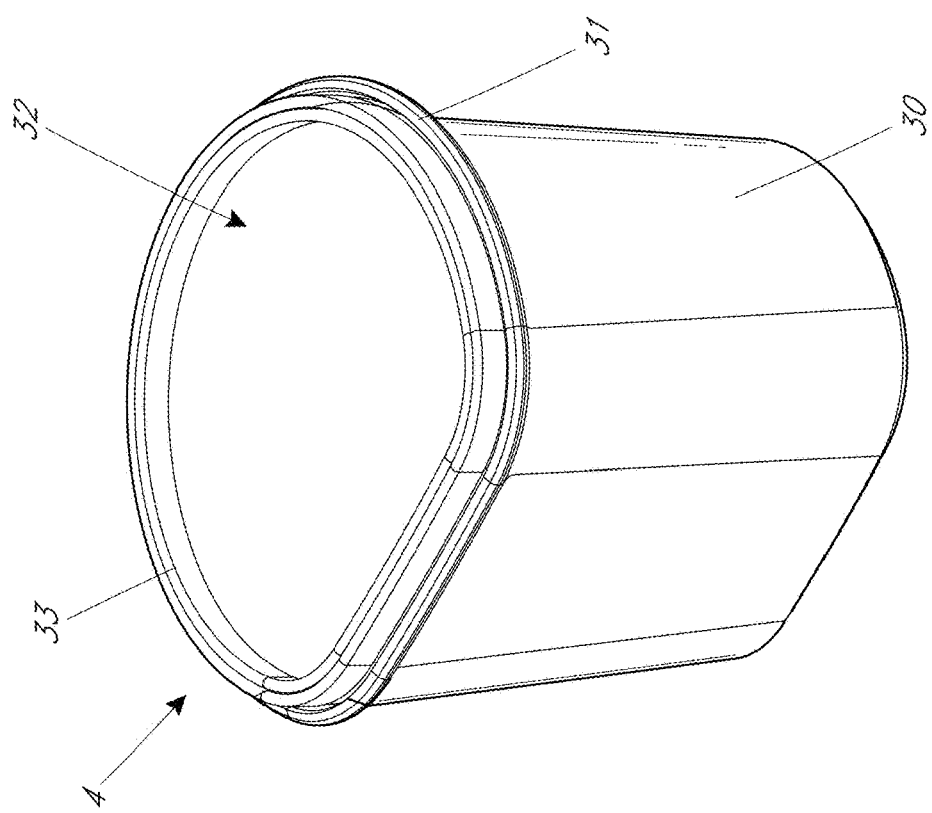
FIG. 5A is a schematic perspective view of a filter assembly, according to some embodiments.
Figure 5D:
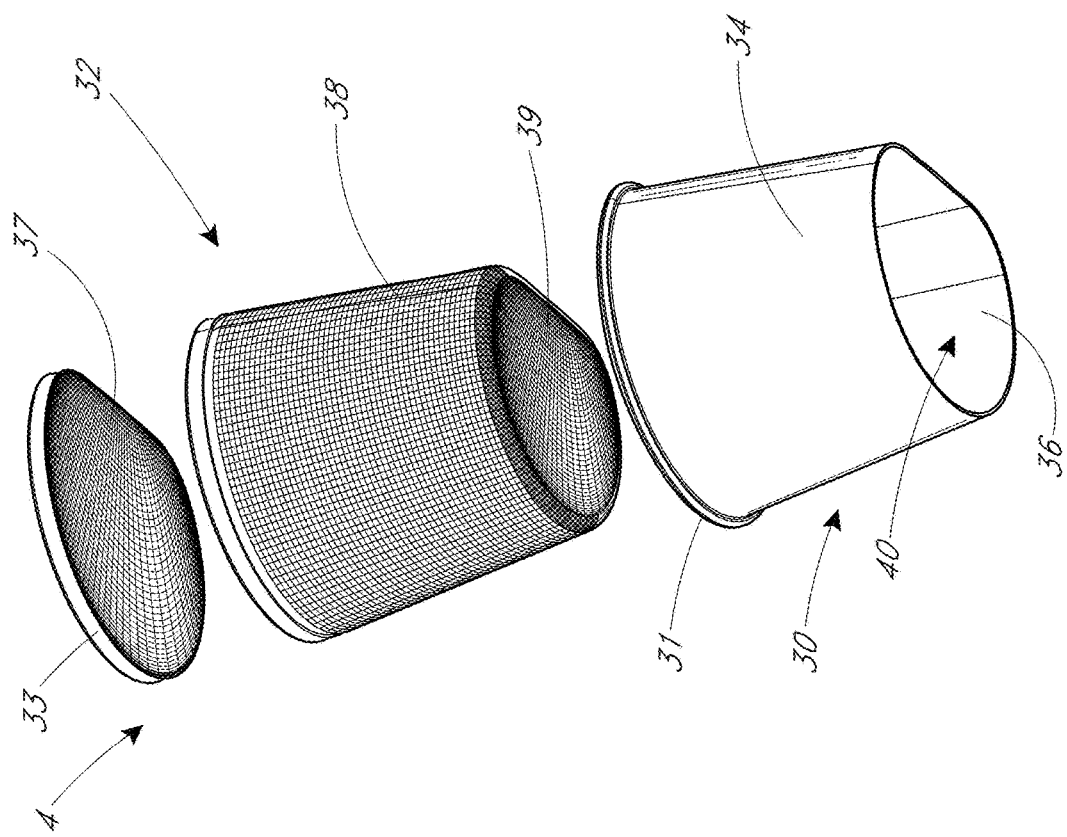
FIG. 5D is a bottom exploded perspective view of the filter assembly of FIG. 5C.
Figure 5C:
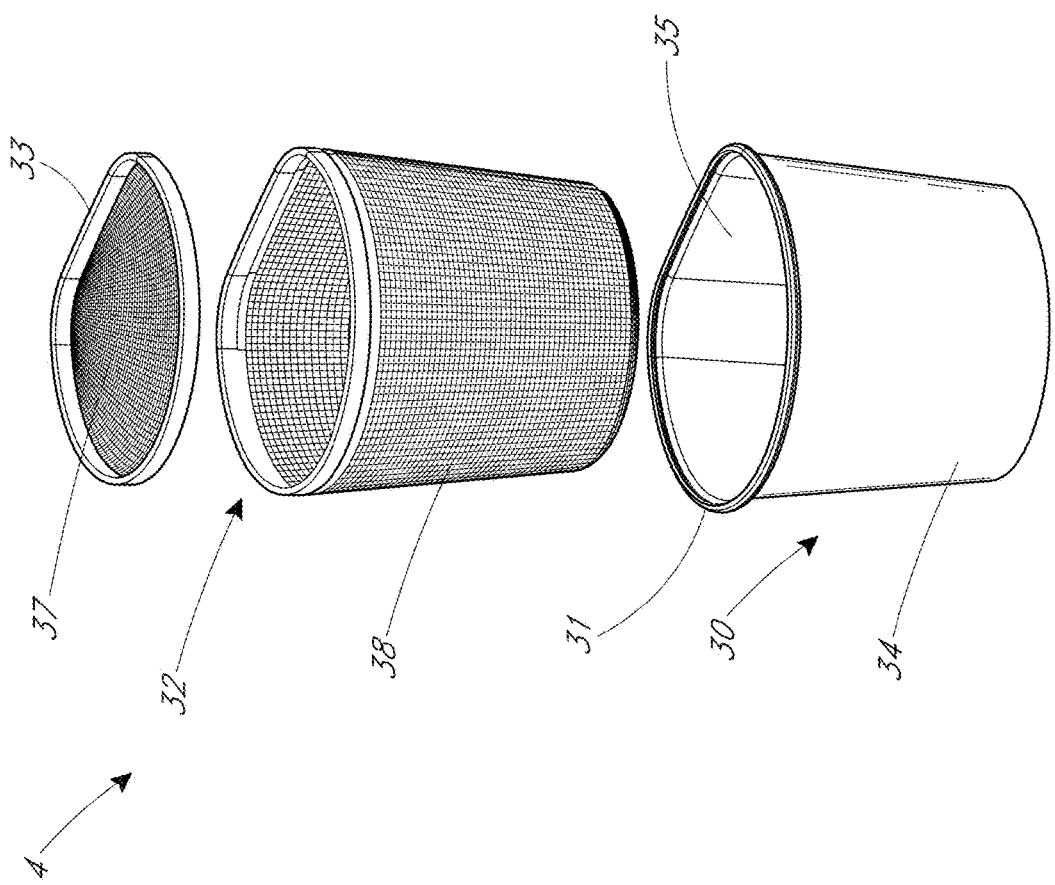
FIG. 5C is a top exploded perspective view of the filter assembly shown in FIGS. 5A-5B.

FIG. 5A is a schematic perspective view of the filter assembly 4, according to some embodiments. FIG. 5B is a schematic side view of the filter assembly 4 of FIG. 5A. FIG. 5C is a top exploded perspective view of the filter assembly 4 shown in FIGS. 5A-5B. FIG. 5D is a bottom exploded perspective view of the filter assembly 4 of FIG. 5C. As explained above, the filter assembly 4 can be removably attached to the cap 5, e.g., can be snapped or otherwise connected to the sidewall 15. For example, an annular flange 31 can extend about the periphery of the filter assembly 4. The user can insert the filter assembly 4 into the recess defined by the sidewall 15 of the cap 5, and the flange 31 can be snapped into the corresponding groove 24 formed in the sidewall 15. In some embodiments, the user can deform the sidewall 15 (which may comprise a flexible polymer) to accommodate the filter assembly 4. The user can similarly remove the filter assembly 4 by deforming the sidewall 15 to disengage the flange 31 from the groove 24.

The filter assembly 4 can include a sleeve 30 and a filter cartridge 32 which is disposed within the sleeve 30. As shown in FIGS. 5C and 5D, the sleeve 30 can comprise a first opening 35, a second opening 36, and an annular wall 34 extending between the first opening 35 and the second opening 36 to define a filter cavity 40. The annular wall 34 can comprise a continuous sheet of material, e.g., the wall 34 may not be porous in the illustrated embodiment. The filter cartridge 32 can comprise a mesh basket having a top mesh filter pad 37, a bottom mesh filter pad 39, and a mesh wall 38 extending between the top mesh filter pad 37 and the bottom mesh filter pad 39. In some embodiments, the top mesh filter pad 37 can be welded to the mesh wall 38 so as to form a permanent connection between the filter pad 37 and wall 38. In other embodiments, the top mesh filter pad 37 may be removably connected to the mesh wall 38 such that the top mesh filter pad 37 can be removed, or open and closed (e.g., pivoted), relative to the mesh wall 38. For example, in some embodiments, the top filter pad 37 can be rotatably coupled with the wall 38. In some arrangements, ingredients (such as flavor infusants, vitamins, etc.) can be inserted into the filter cartridge 32 to provide flavor to the liquid passing through the filter assembly 4. As shown in FIGS. 5A-5D, a vertically-extending flange 33 can disposed about the perimeter of an outer surface of the top mesh filter pad 37. The flange 33 can assist in securing the filter assembly 4 to the cap 5.

To install the filter assembly 4, the user can insert the filter cartridge 32 within the sleeve 30, and can insert the combined filter assembly 4 into the sidewall 15 of the cap 5. As explained above, the flange 31 can snap into the groove 24 of the sidewall 15 to secure the filter assembly 4 to the cap 5. To replace the filter cartridge 32, the user can remove the filter assembly 4 from the cap 5 and can insert a new filter cartridge 32 into the sleeve 30 and cap 5. The filter cartridge 32 can be at least partially, or completely, filled with filtration media, such as granular activated carbon. In operation, water can flow through the fill aperture 12 and into the reservoir 7 and filter assembly 4. The water can flow by way of gravity through the top mesh filter pad 37 and through the filtration media, where contaminants can be removed. The filtered water can pass through the bottom filter pad 39 and into the chamber 3 of the container body 2 to provide filtered water to the user. The filter assembly 4 can comprise stainless steel in some embodiments. For example, the sleeve 30 and the filter cartridge 32 can both comprise stainless steel in some embodiments. In other embodiments, the filter assembly 4 (e.g., the sleeve 30 and/or the cartridge 32) can comprise a polymer.

Figure 5F:
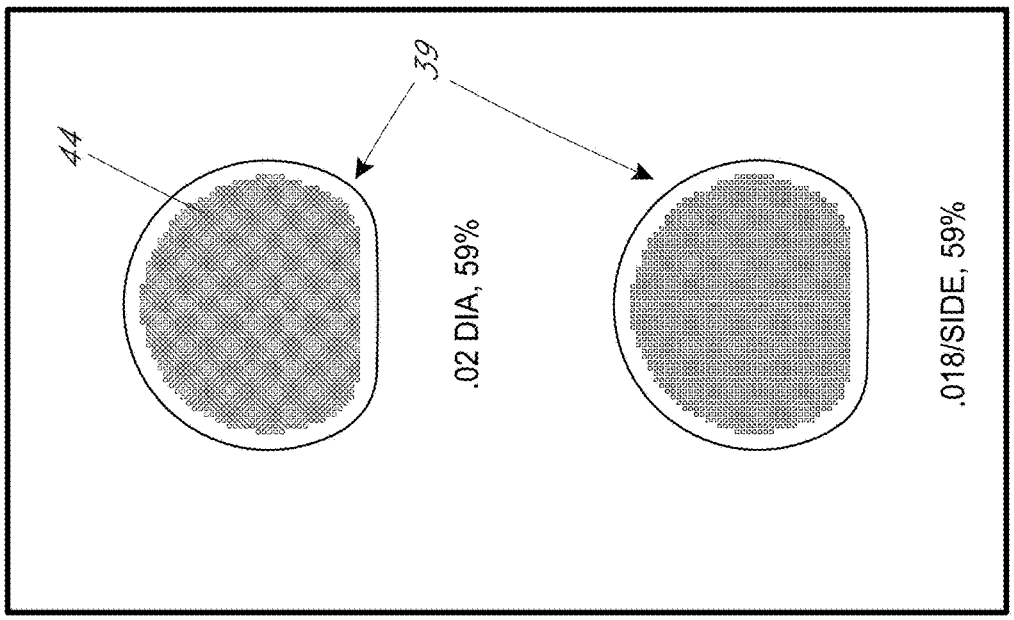
FIG. 5F is a top plan view of a bottom mesh filter pad, shown with various pore sizes.
Figure 5E:
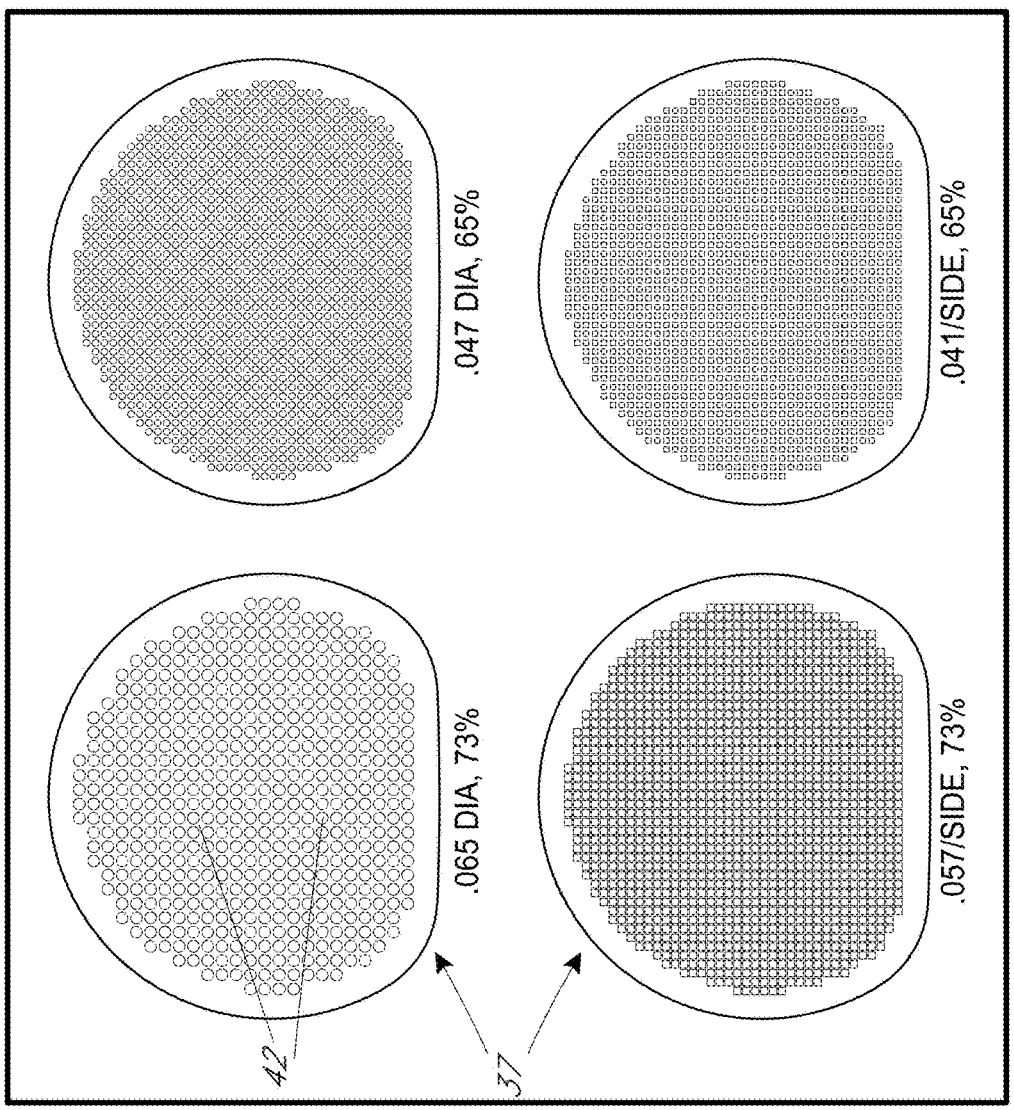
FIG. 5E is a top plan view of a top mesh filter pad, shown with various pore sizes.

FIG. 5E is a top plan view of the top mesh filter pad 37, shown with various pore sizes. FIG. 5F is a top plan view of the bottom mesh filter pad 39, shown with various pore sizes. As illustrated, pores 42 of the top filter pad 37 (e.g., the inlet of the filter assembly 4) can be larger or coarser than pores 44 of the bottom filter pad 39 (e.g., the outlet of the filter assembly 4). The larger pores 42 of the top filter pad 37 can enhance the venting of air between the reservoir 7 and the filter cavity 40. The smaller pores 44 of the bottom filter pad 39 can be sized so as to support and contain the filtration media. In some embodiments, the pore size of the top mesh filter pad 37 (or filter inlet) can be in a range of 0.01 inches to 0.1 inches, or more particularly, in a range of 0.04 inches to 0.07 inches, in a range of 0.015 inches to 0.06 inches, or in a range of 0.018 inches to 0.057 inches. The pore size of the bottom mesh filter pad 39 (or filter outlet) can be in a range of 0.001 inches to 0.03 inches in a range of 0.015 inches to 0.06 inches, or in a range of 0.018 inches to 0.057 inches. In some embodiments, the pores 42 may comprise between 60% and 80% of the overall area of the top filter pad 37, e.g., between 64% and 75% of the overall area. In some embodiments, the pores 44 may comprise between 55% and 65% of the overall area of the bottom filter pad 39.

Figure 5H:
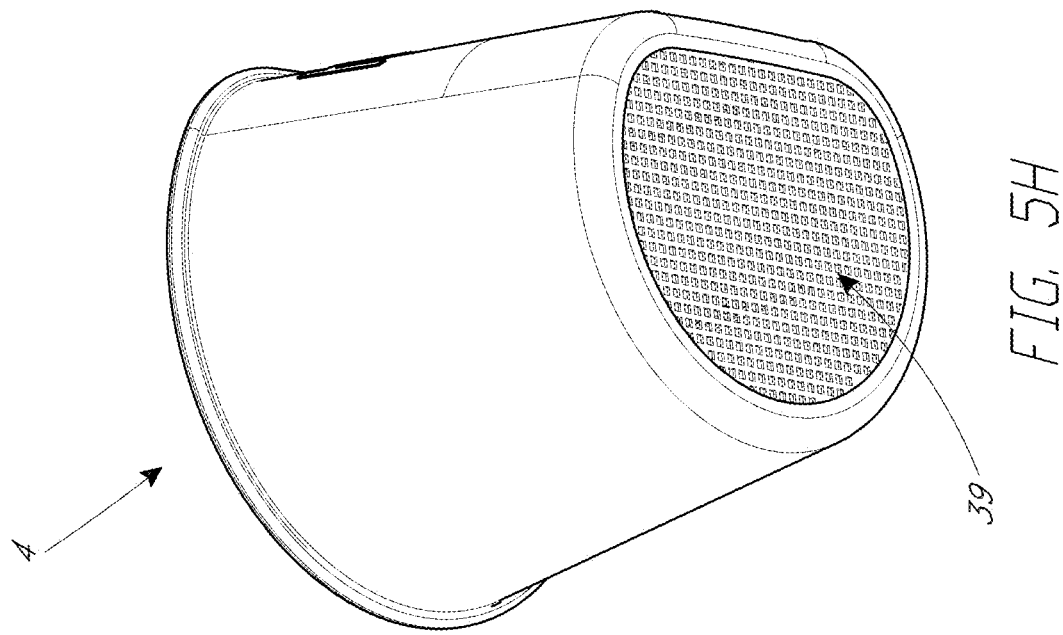
FIG. 5H is a schematic bottom perspective view of the filter assembly shown in FIG. 5G.
Figure 5G:
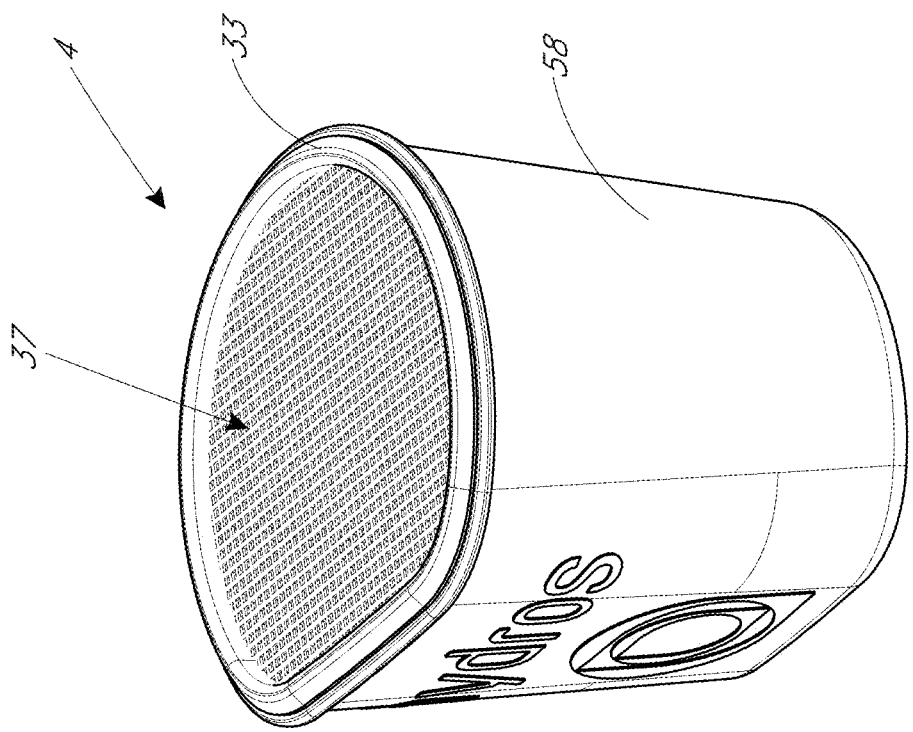
FIG. 5G is a schematic top perspective view of a filter assembly, according to various embodiments.

FIG. 5G is a schematic top perspective view of a filter assembly 4, according to various embodiments. FIG. 5H is a schematic bottom perspective view of the filter assembly 4 shown in FIG. 5G. The filter assembly 4 can comprise a filter body 58 coupled to or formed with the top filter pad 37 and the bottom filter pad 39, which may be similar to the filter pads described above. In the embodiment shown in FIGS. 5G-5H, the filter body 58 can comprise a molded plastic body, and the filter pads 37, 39 can be connected to the filter body 58 in any suitable manner, e.g., by a snapfit connection. In some arrangements, the filter pads 37, 39 can comprise stainless steel inserts. In other arrangements, the filter pads 37, 39 can comprise a plastic. In other embodiments, the filter pads 37, 39 can be integrally formed with the filter body 58.

The filter assembly 4 and cap 5 disclosed herein can enable relatively fast flow rates through the filter assembly 4, e.g., flow rates in a range of 0.25 liters per minute (Lpm) to 2 Lpm, in a range of 1 Lpm to 2 Lpm, in a range of 1.5 Lpm to 2 Lpm, or in a range of 1.5 Lpm to 2.5 Lpm, e.g., at least about 0.5 Lpm. In some embodiments, the flow rate of liquid through the filter assembly 4 is in a range of 0.5 Lpm to 1.75 Lpm. Beneficially, the flow rates described above may be achieved while effectively filtering the water according to the NSF 42 standard (Class 1), as set forth as of the filing date of the Application. For example, the filter assembly 4 disclosed herein can reduce chlorine from unfiltered water by 50% or more, or by 75% or more, at the aforementioned flow rates. In various embodiments, the filtration media disposed within the filter assembly 4 (e.g., within the filter body 58) can comprise granular activated carbon (GAC). The GAC can comprise any suitable size and mass. For example, in some embodiments, the mass of the GAC filtration media can be in a range of 20 grams to 40 grams, e.g., in a range of 24 grams to 36 grams. The size of the GAC filtration media can be in a range of 6×12 to 8×16.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An apparatus for dispensing a liquid, the apparatus comprising:
   a container body;
   a cap configured to removably attach to the container body and having a chamber for containing the liquid, the cap comprising:
      a first vent through the cap to enable air to pass from the chamber of the container body through the first vent and outside the container body;
      a fill aperture through which the liquid is supplied to the container body;
      a pour aperture through which the liquid exits the apparatus;
      a fill lid rotatable about a pivot axis in a first direction to close the fill aperture and rotatable about the pivot axis in a second direction to open the fill aperture, the first direction opposite the second direction, the pivot axis non-parallel to a longitudinal axis of the apparatus; and
      a pour lid rotatable about the pivot axis in the first direction to open the pour aperture and rotatable about the pivot axis in the second direction to close the pour aperture; and
   a filter assembly which connects to the cap, the filter assembly comprising a filter cavity to contain filtration media.

2. The apparatus of claim 1, wherein the filter assembly comprises a filter body, with a top filter pad coupled with an inlet of the filter assembly and a bottom filter pad coupled with an outlet of the filter assembly.

3. The apparatus of claim 1, wherein the filter assembly further comprises a sleeve comprising a first opening, a second opening, and an annular wall extending between the first opening and the second opening to define the filter cavity, the filter assembly comprising a filter cartridge disposed in the filter cavity.

4. The apparatus of claim 1, wherein the filter assembly comprises a mesh basket comprising a top mesh filter pad, a bottom mesh filter pad, and a mesh wall extending between the top mesh filter pad and the bottom mesh filter pad, the mesh basket at least partially defining the filter cavity.

5. The apparatus of claim 4, wherein the mesh basket comprises stainless steel.

6. The apparatus of claim 4, wherein the filter assembly further comprises a vertically-extending flange disposed about the perimeter of an outer surface of the top mesh filter pad.

7. The apparatus of claim 4, wherein a pore size of the top mesh filter pad is larger than a pore size of the bottom mesh filter pad.

8. The apparatus of claim 1, wherein the cap comprises a platform disposed below the pour lid and the fill lid and a sidewall extending transversely from a bottom side of the platform, the sidewall defining a recess sized and shaped to receive the filter assembly, the sidewall and recess configured to be disposed within the chamber of the container body.

9. The apparatus of claim 8, wherein the first vent is disposed through the sidewall to provide fluid communication between the chamber of the container body and the recess.

10. The apparatus of claim 8, further comprising a second vent through the platform to provide fluid communication between the recess and the outside environs.

11. The apparatus of claim 10, wherein the cap has a pouring configuration in which the liquid exits the apparatus and a filling configuration in which the liquid is supplied to the container body, wherein, when the cap is in the filling configuration, the second vent is occluded, and wherein, when the cap is in the pouring configuration, the second vent is open.

12. The apparatus of claim 8, further comprising the filter assembly coupled with the sidewall and disposed at least partially in the recess, the filter assembly having an outwardly-extending flange at an upper end portion of the filter assembly, the flange disposed in a corresponding groove of the sidewall.

13. The apparatus of claim 1, further comprising a diffuser disposed above the filter assembly, the diffuser comprising a diffuser body having one or a plurality of diffuser openings therethrough.

14. An apparatus for dispensing a liquid, the apparatus comprising:
a cap configured to connect to a container body having a chamber for containing the liquid, the cap comprising:
a first vent through the cap to enable air to pass from the chamber of the container body through the first vent and outside the container body;
a fill aperture through which the liquid is supplied to the container body;
a pour aperture through which the liquid exits the apparatus;
a fill lid rotatable about a pivot axis in a first direction to close the fill aperture and rotatable about the pivot axis in a second direction to open the fill aperture, the first direction opposite the second direction, the pivot axis non-parallel to a longitudinal axis of the apparatus;
a pour lid rotatable about the pivot axis in the first direction to open the pour aperture and rotatable about the pivot axis in the second direction to close the pour aperture; and
a filter assembly which connects to the cap, the filter assembly comprising a filter cavity to contain filtration media,
wherein the filtration media is disposed within the filter assembly.

15. The apparatus of claim 14, wherein the filtration media comprises granular activated carbon.

* * * * *